United States Patent
Sehgal et al.

(10) Patent No.: US 11,910,225 B2
(45) Date of Patent: Feb. 20, 2024

(54) ADAPTIVE ADJUSTMENT FOR TARGET WAKE TIME DURATION CONFIGURATION

(71) Applicant: Samsung Electronics Co., Ltd., Suwon-si (KR)

(72) Inventors: Abhishek Sehgal, Plano, TX (US); Guanbo Chen, Allen, TX (US); Wenxun Qiu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 17/444,981

(22) Filed: Aug. 12, 2021

(65) Prior Publication Data
US 2022/0201533 A1 Jun. 23, 2022

Related U.S. Application Data

(60) Provisional application No. 63/127,837, filed on Dec. 18, 2020.

(51) Int. Cl.
| | | |
|---|---|---|
| H04W 28/02 | (2009.01) | |
| H04W 24/08 | (2009.01) | |
| H04W 52/02 | (2009.01) | |

(52) U.S. Cl.
CPC ....... *H04W 28/0221* (2013.01); *H04W 24/08* (2013.01); *H04W 52/0216* (2013.01)

(58) Field of Classification Search
None
See application file for complete search history.

(56) References Cited

U.S. PATENT DOCUMENTS

| | | | |
|---|---|---|---|
| 8,369,216 B2 | 2/2013 | Kan | |
| 9,198,197 B2 | 11/2015 | Kneckt et al. | |
| 2017/0064633 A1* | 3/2017 | Jia | H04W 52/0258 |
| 2017/0339680 A1* | 11/2017 | Jia | H04W 52/0216 |
| 2018/0115950 A1* | 4/2018 | Asterjadhi | H04W 76/28 |
| 2018/0145801 A1* | 5/2018 | Wang | H04L 1/1864 |
| 2018/0192372 A1* | 7/2018 | Park | H04W 52/0229 |
| 2019/0053155 A1* | 2/2019 | Kneckt | H04W 72/23 |
| 2019/0253968 A1* | 8/2019 | Xiao | H04W 28/0289 |
| 2019/0306790 A1 | 10/2019 | Kottontavida et al. | |
| 2019/0306794 A1 | 10/2019 | Ghosh | |

(Continued)

FOREIGN PATENT DOCUMENTS

| | | | |
|---|---|---|---|
| DE | 102021106714 | * | 3/2021 |
| KR | 10-2018-0106607 | * | 1/2018 |

(Continued)

OTHER PUBLICATIONS

Nurchis et al., "Target Wake Time: Scheduled Access in IEEE 802.11ax WLANs," IEEE Wireless Communications, vol. 26, No. 2, Apr. 2019, pp. 142-150.

(Continued)

*Primary Examiner* — Andre Tacdiran

(57) ABSTRACT

A wireless communication device comprising a processor configured to obtain first information on network conditions and second information on packets delivered to another communication device during a current target wake time (TWT) session, and to update a TWT service period (SP) duration for a future TWT session based on the first information and the second information.

17 Claims, 18 Drawing Sheets

(56) References Cited

U.S. PATENT DOCUMENTS

| | | | |
|---|---|---|---|
| 2020/0068648 A1 | 2/2020 | Lin | |
| 2020/0084102 A1* | 3/2020 | Choi | H04W 72/0446 |
| 2020/0374801 A1 | 11/2020 | Chu et al. | |
| 2021/0037464 A1 | 2/2021 | Cariou et al. | |
| 2021/0250858 A1* | 8/2021 | Chen | H04W 72/23 |
| 2021/0368436 A1* | 11/2021 | Li | H04W 76/28 |
| 2022/0110053 A1* | 4/2022 | Chu | H04W 52/0216 |
| 2022/0225236 A1* | 7/2022 | Bang | H04W 72/04 |

FOREIGN PATENT DOCUMENTS

| | | | |
|---|---|---|---|
| KR | 20180088406 | * | 8/2018 |
| WO | WO2014084665 | * | 1/2014 |
| WO | WO2017164687 | * | 3/2017 |
| WO | 2020146094 A1 | | 7/2020 |
| WO | 2020246708 A1 | | 12/2020 |

OTHER PUBLICATIONS

Qinghua Chen et al., "A Target Wake Time Scheduling Scheme for Uplink Multiuser Transmission in IEEE 802.11ax-Based Next Generation WLANs", Oct. 30, 2019, 16 pages.

Maddalena Nurchis et al., "Target Wake Time: Scheduled access in IEEE 802.11ax WLANs", Apr. 20, 2018, 13 pages.

International Search Report dated Mar. 24, 2022 in connection with International Patent Application No. PCT/KR2021/018993, 4 pages.

Written Opinion of the International Searching Authority dated Mar. 24, 2022 in connection with International Patent Application No. PCT/KR2021/018993, 4 pages.

Extended European Search Report dated Jan. 4, 2024 regarding Application No. 21907064.6, 8 pages.

* cited by examiner $T_{wakeupOH}$ Wakeup overhead of TWT service $T_{OH+contention}$ The overhead and the contention time associated with the communication of the packet

ADAPTIVE ADJUSTMENT FOR TARGET WAKE TIME DURATION CONFIGURATION

CROSS-REFERENCE TO RELATED APPLICATION(S) AND CLAIM OF PRIORITY

This application claims priority under 35 U.S.C. § 119(e) to U.S. Provisional Patent Application No. 63/127,837 filed on Dec. 18, 2020, which is hereby incorporated by reference in its entirety.

TECHNICAL FIELD

This disclosure relates generally to power management in wireless communications systems. Embodiments of this disclosure relate to methods and apparatuses for determining a target wake time duration for communications in a wireless local area network communications system.

BACKGROUND

With the standardization process of the next generation IEEE 802.11 wireless local area network (WLAN), i.e., IEEE 802.11ax amendment entering the final stage, the IEEE802.11ax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the WI-FI 6 certification program for guaranteeing interoperability between certified products implementing IEEE 802.11ax amendment. In the market, device manufacturers are already starting to release WI-FI 6 certified smart mobile devices.

Target Wake Time (TWT) is one of the important features of the IEEE 802.11ax amendment. TWT enables wake time negotiation between an access point (AP) and an associated station (STA) or client. The wake time negotiation gives rise to TWT sessions (e.g., consecutive TWT sessions), where the STA wakes up at pre-negotiated times and for specified durations of time to communicate with the AP (e.g., via UL and/or DL communications). The IEEE 802.11ax amendment allows for periodic awakening, non-periodic awakening, and at-will awakening by the STA.

SUMMARY

Embodiments of the present disclosure provide a method and an apparatus for determining a target wake time duration for communications in a wireless local area network communications system.

In one embodiment, a communication device is provided, comprising a processor configured to obtain first information on network conditions and second information on packets delivered to another communication device during a current target wake time (TWT) session, and update a TWT service period (SP) duration for a future TWT session based on the first information and the second information. The processor can be further configured to identify, based on the second information on the delivered packets, a set of buffered packets from among the delivered packets, estimate, based on features of the set of buffered packets, a data time of the current TWT session as a total amount of time needed to transmit all of the delivered packets, and determine a new TWT SP duration based, in part, on the data time.

In another embodiment, a method for wireless communication is provided, including the steps of obtaining first information on network conditions and second information on packets delivered to another communication device during a current target wake time (TWT) session, and updating a TWT service period (SP) duration for a future TWT session based on the first information and the second information. The method can be further include identifying, based on the second information on the delivered packets, a set of buffered packets from among the delivered packets, estimating, based on features of the set of buffered packets, a data time of the current TWT session as a total amount of time needed to transmit all of the delivered packets, and determining a new TWT SP duration based, in part, on the data time.

In another embodiment, a non-transitory computer-readable medium is provided, wherein the non-transitory computer-readable medium is configured to store instructions that, when executed by a processor, cause the processor to obtain first information on network conditions and second information on packets delivered to another communication device during a current target wake time (TWT) session, and update a TWT service period (SP) duration for a future TWT session based on the first information and the second information. The non-transitory computer-readable medium can be further configured to store instructions that, when executed by the processor, cause the processor to identify, based on the second information on the delivered packets, a set of buffered packets from among the delivered packets, estimate, based on features of the set of buffered packets, a data time of the current TWT session as a total amount of time needed to transmit all of the delivered packets, and determine a new TWT SP duration based, in part, on the data time.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure and its advantages, reference is now made to the following description taken in conjunction with the accompanying drawings, in which like reference numerals represent like parts.

DETAILED DESCRIPTION

Figure 1:
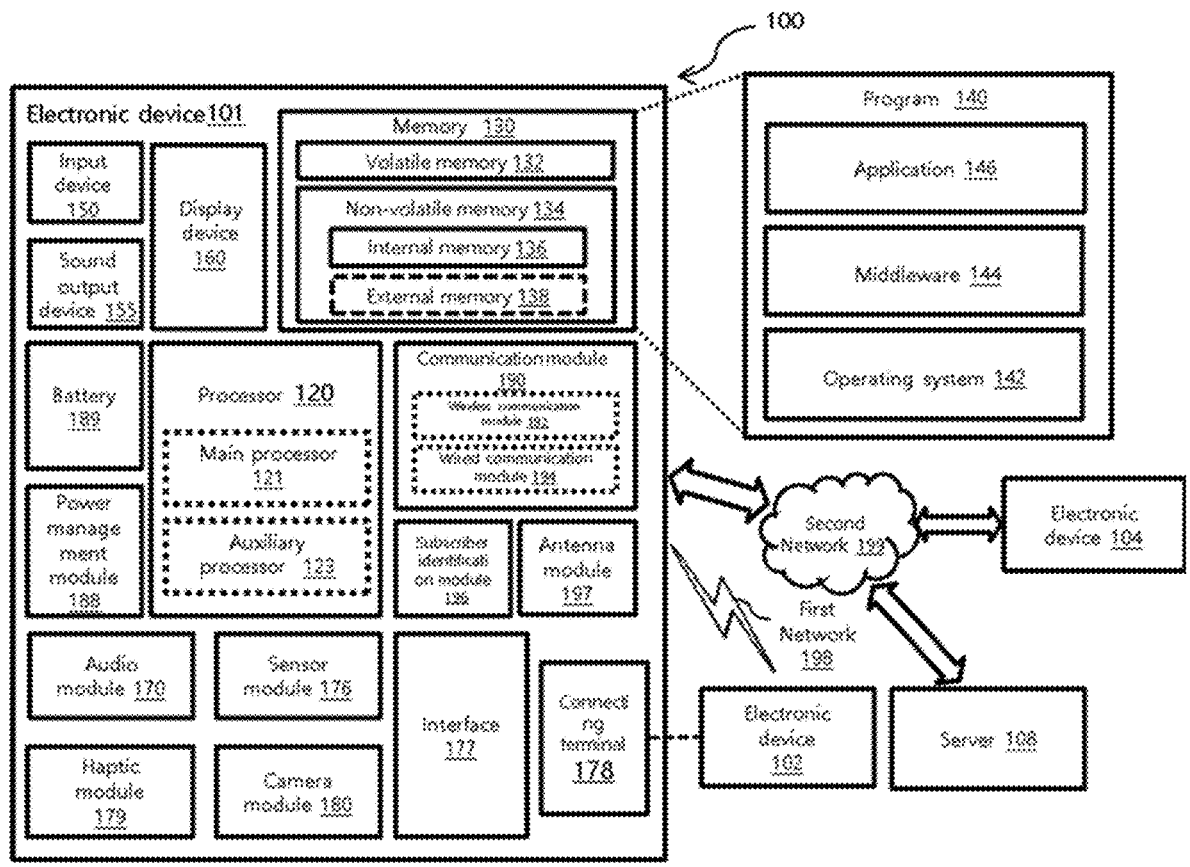
FIG. 1 illustrates an example electronic device in a network environment 100 according to various embodiments of the present disclosure.

FIGS. 1 through 17C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that conventional power saving mechanisms in WI-FI systems do not take the communication pattern between the AP and STA into account. Typically, when the STA has an active communication link with the AP, the STA remains active and switches on a power saving mechanism only when the STA's screen is turned off. Power saving mechanisms in WI-FI systems can include a beacon-triggered solution or an Unscheduled Automatic Power Save Delivery (U-APSD) solution. In the beacon-triggered solution, the triggers are beacon intervals which are 100 ms or larger. Consequently, the beacon-triggered solution adds to latency as the communication between the AP and STA needs to wait for the next trigger for communication. In the U-APSD solution, the STA (or AP) wakes up to transmit if it has data and checks if the AP (or STA) has any data buffered, but in this case, the STA (or AP) has no information about the traffic pattern between the STA and the AP.

Embodiments of the present disclosure provide apparatuses and methods that leverage the introduction of Target Wake Time (TWT) to the standard in IEEE 802.11ax to cause the STA to wake up at periodic intervals and for specific durations of time based on the traffic and communication pattern between the AP and STA. Current methods of determining TWT parameters do not take into account the current traffic between the AP and STA and do not dynamically adapt the TWT parameters in response to the type of traffic exchanged between the AP and the STA. Better methods of determining TWT parameters may be needed.

Embodiments of the present disclosure consider the traffic and communication pattern between the AP and STA in a TWT session to determine the TWT SP duration (namely, the amount of time within a TWT interval that a STA is active) for at least the next TWT session. The apparatuses and methods of the present disclosure can save power in the STA by causing the STA to doze off when data has been communicated (e.g., in ULs and/or DLs) and to wake up to communicate the next data batch (e.g., in ULs and/or DLs) when such data becomes available. Furthermore, embodiments of the present disclosure take into account whether the traffic between the AP and STA is stable or bursty and adaptively update the TWT SP duration for the next TWT session based on these considerations.

Given deterministic communication and knowledge of the network environment, embodiments of the present disclosure can determine a TWT SP duration for a given TWT interval that can have the advantageous effects of saving additional power at the STA without degrading the user experience. Specifically, for a given TWT interval, embodiments of the present disclosure identify an optimal TWT SP duration for the traffic and communication pattern between the AP and STA.

FIG. 1 illustrates an example electronic device 101 in a network environment 100 according to various embodiments of the present disclosure. In this embodiment, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.

The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components (e.g., the display device 160 or the camera module 180) may be omitted from the electronic device 101, or one or more other components may be added in the electronic device 101. In some embodiments, some of the components may be implemented as a single integrated circuit. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101 instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data from the outside (e.g., from a user) of the electronic device 101, to be used by another component (e.g., the processor 120) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a recording, and the receiver may be used for incoming calls. According to an embodiment, the receiver may be implemented separate from or as part of the speaker.

The display device 160 may visually provide information to the outside (e.g., to a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force induced by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a luminance sensor, a blockage sensor, or a folding state sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, WI-FI DIRECT, Ultra-WideBand (UWB), or INFRARED DATA ASSOCIATION (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside of the electronic device 101 (e.g., to or from an external electronic device). According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to an embodiment, the electronic device 101 may include multiple antenna modules 197. Each antenna module 197 can have multiple antennas, referred to as antenna elements, configured such that the antenna module 197 is capable of beamforming using the multiple antenna elements.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments may be one of various types of electronic devices. The electronic devices may include, for example, a communication device, a portable communication device (e.g., a smartphone), a computer device, a portable multimedia device, a portable medical device, a camera, a wearable device, or a home appliance. In various embodiments, the electronic device 101 may be a IEEE 802.11 STA or a IEEE 802.11 AP. It is understood that the electronic devices are not limited to those described above.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., GOOGLE PLAY STORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
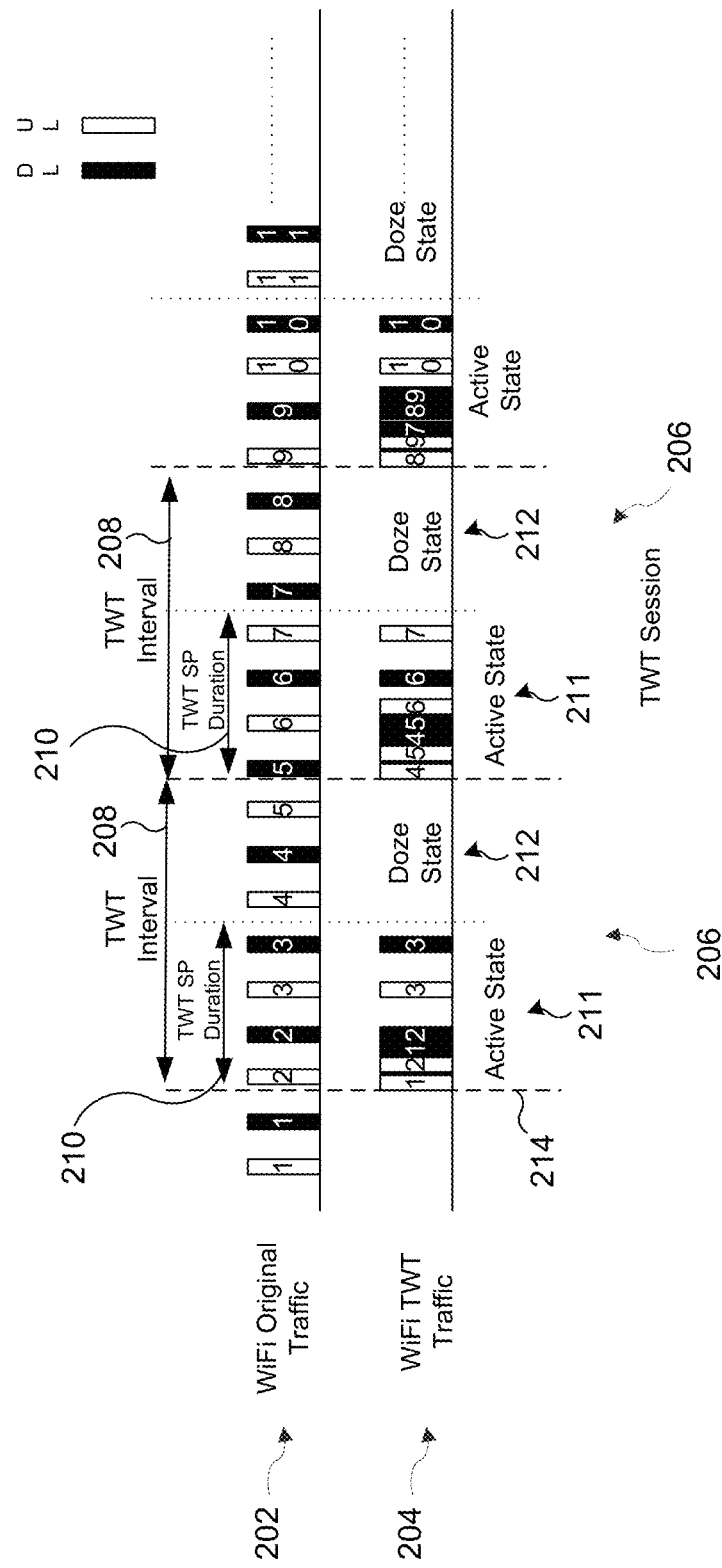
FIG. 2 illustrates a diagram of packet exchange between devices according to embodiments of the present disclosure.

FIG. 2 illustrates a diagram of packet exchange between devices according to embodiments of the present disclosure. For the purposes of this disclosure, the figures will be discussed from the point of view of a STA, which may be an electronic device 101, but it is understood that it could be any suitable wireless communication device.

FIG. 2 illustrates two scenarios of exchange of uplink (UL) communication packets and downlink (DL) communication packets (which may be collectively referred to as traffic) between an AP and an associated STA. First, without wake time negotiation between the AP and the STA (e.g., as seen in the top graph 202), and second, with wake time negotiation between the AP and the STA (e.g., in an IEEE 802.11ax system and as seen in the bottom graph 204). In the top graph 202, there is a regular stream of non-buffered traffic between the AP and the STA, with UL packets being interspersed with DL packets. In this scenario (i.e., without wake time negotiation) there is no option for the STA to enter a doze state or a power save state.

By contrast, in the bottom graph 204, wake time negotiation gives rise to consecutive TWT sessions 206. Each TWT session 206 is defined as the time period from the beginning of a TWT interval 208 to the end of the TWT interval 208. Each TWT session 206 includes two states: an active state 211, defined by a TWT service period (SP) duration 210 (during which the STA is awake to communicate with the AP), and a power save state or doze state 212 (during which the STA is not actively awake or communicating with the AP). As a result of wake time negotiation, power efficiency at the STA is improved without adding too much latency or allowing UL or DL packets to be dropped.

In wake time negotiation, the negotiated TWT parameters include the wake interval (e.g., the TWT interval 208 for each TWT session 206), wake duration (e.g. the TWT SP duration 210 for each TWT session 206), and initial wake time or offset (e.g., indicated by the TWT start time 214). These negotiated parameters highly affect latency, throughput, and power efficiency, which are directly related to the QoS (quality of service) a customer experiences. Services with different traffic characteristics can have different TWT parameter configurations for better QoS. Additionally, the TWT configuration should adapt to network and service status variation.

Figure 3:
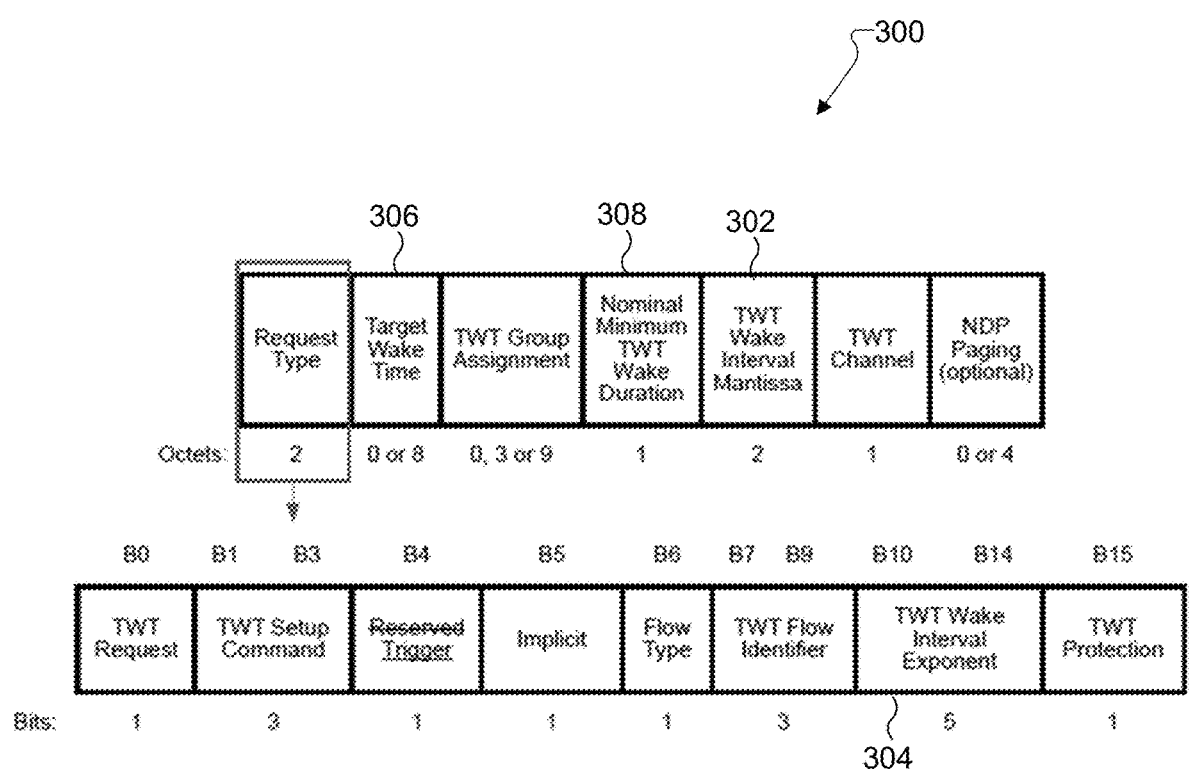
FIG. 3 illustrates an example TWT parameter set field used for TWT parameter negotiation according to embodiments of the present disclosure.

In some embodiments, a TWT parameter set field is used to negotiate the TWT parameters. FIG. 3 illustrates an example TWT parameter set field 300 used for TWT parameter negotiation according to embodiments of the present disclosure. The TWT agreement is initiated by a STA sending a TWT negotiation request to an AP. Once a TWT agreement is made between the AP and the STA, the STA periodically wakes up to communicate with the AP, where the interval between the successive wake times is jointly specified by the TWT wake interval mantissa 302 and TWT wake interval exponent 304 sub-fields in the TWT parameter set field 300.

The target wake time 306 and nominal minimum TWT wake duration 308 sub-fields specify, respectively, the first wake time for the TWT agreement, and the time for which the STA must wait before going to doze state when there is no transmitted traffic after a wake time, which is the TWT SP duration 210 in FIG. 2.

Figure 4:
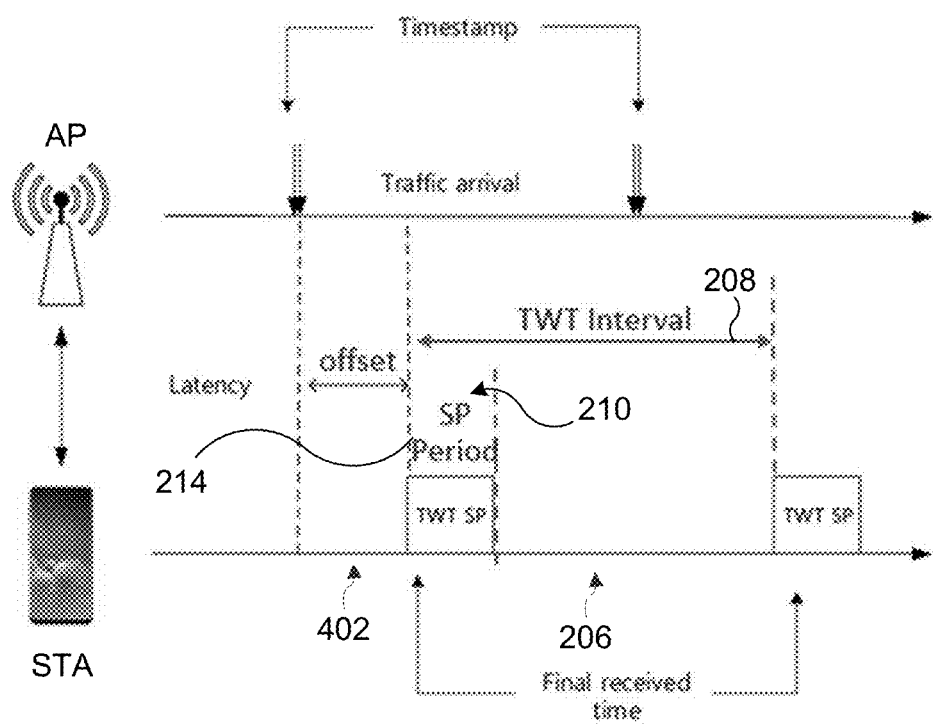
FIG. 4 illustrates an offset in a TWT session according to embodiments of the present disclosure.
Figure 5:
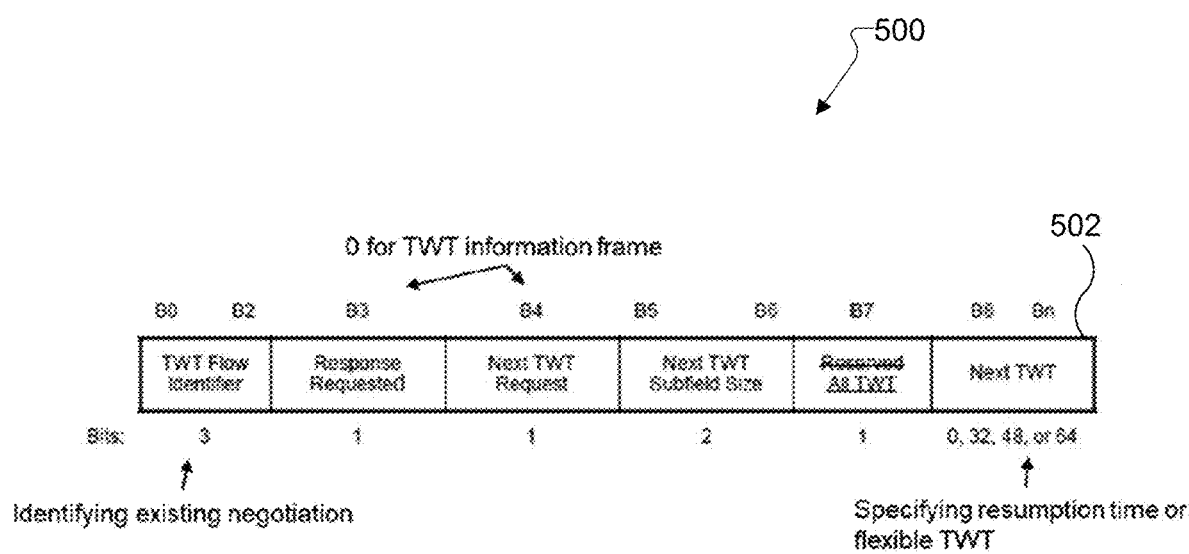
FIG. 5 illustrates an example TWT information frame according to embodiments of the present disclosure.

Other than the wake interval and wake duration, offset is also an important impact factor on the user experience, as the offset could affect the latency. FIG. 4 illustrates an offset in a TWT session according to embodiments of the present disclosure. Different offsets 402 introduce a different additional TWT related latency. TWT interval 208 and offset together define the additional latency introduced by TWT. After TWT negotiation setup, the offset 402 can be adjusted by the field "Next TWT" 502 in the example TWT information frame 500 illustrated in FIG. 5.

Figure 6:
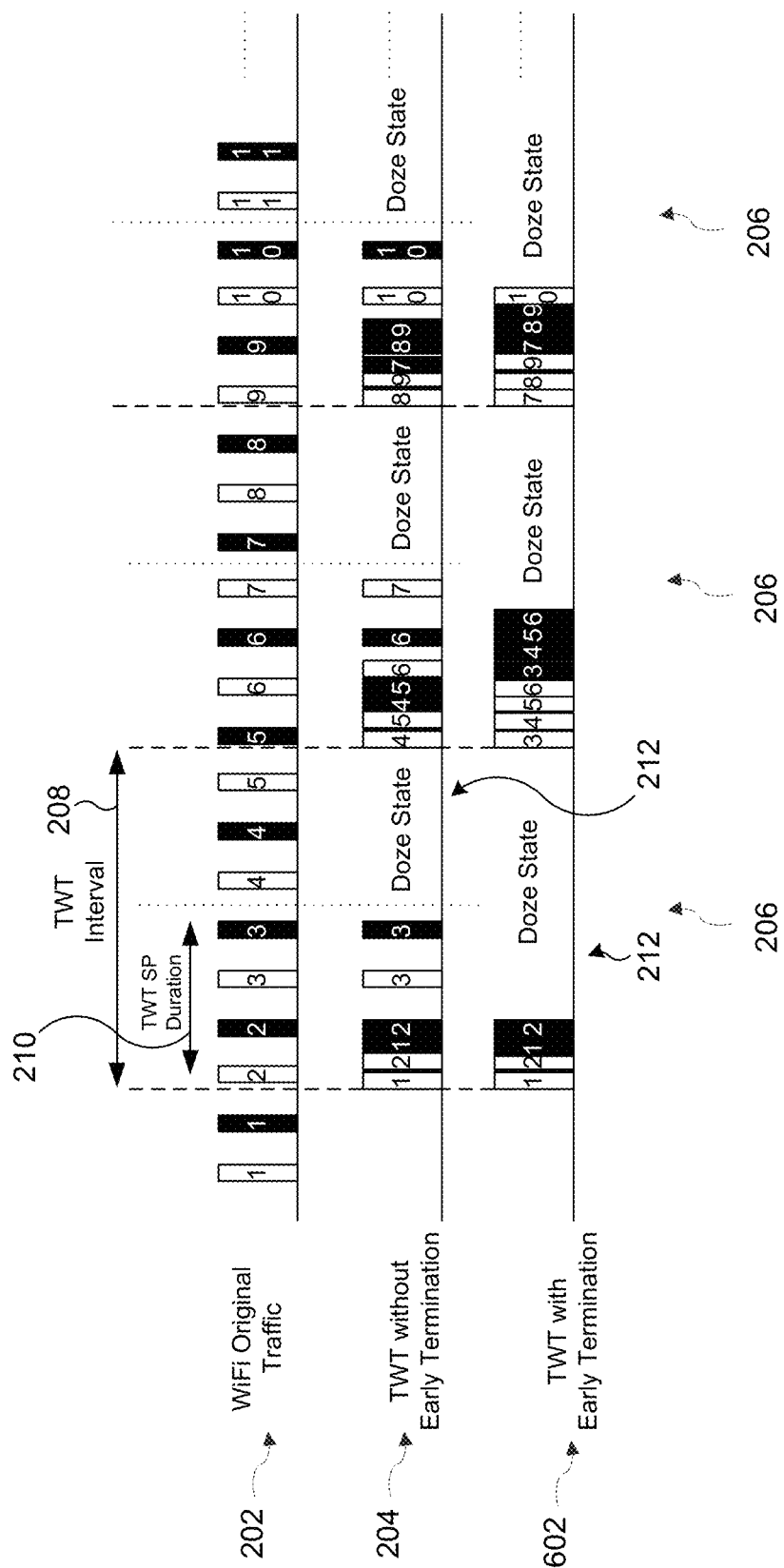
FIG. 6 illustrates an example of early termination of TWT according to embodiments of the present disclosure.

FIG. 6 illustrates an example of early termination of TWT according to embodiments of the present disclosure. In various embodiments, the actual TWT SP duration 210 is dynamically determined in run time by the aforementioned nominal minimum TWT wake duration, and the STA enters the doze state 212 when a packet is received with EOSP (end of service period) bit set to "1", or more data bit set to "0". Depending on whether or not early termination is supported, the time the STA enters the doze state 212 will be slightly different. As shown in graph 602, if the STA supports early termination then once the STA receives a packet with EOSP bit set to "1" or more data bit "0" the STA can enter doze state 212 (although there could be a slight delay between reception of the packet and entering doze state 212). If the STA does not support early termination, then it will wait until end of TWT SP duration to enter doze state 212, as shown in graph 204.

In some embodiments, the type of traffic between a STA and AP can affect the optimal TWT parameters, and in particular the optimal TWT interval and TWT SP duration. Internet traffic can be broadly classified into two types for network communication based applications: time sensitive traffic, and high throughput traffic. Time sensitive traffic packets need to be delivered as soon as they arrive (e.g., for applications such as VoIP, Video Conferencing, Online Gaming, or Screen Mirroring). Time sensitive traffic is generated at a stable rate but is sensitive to latency. High throughput traffic packets are not as sensitive to packet latency, but large amounts of data may need to be transferred in bursts.

Figure 7:
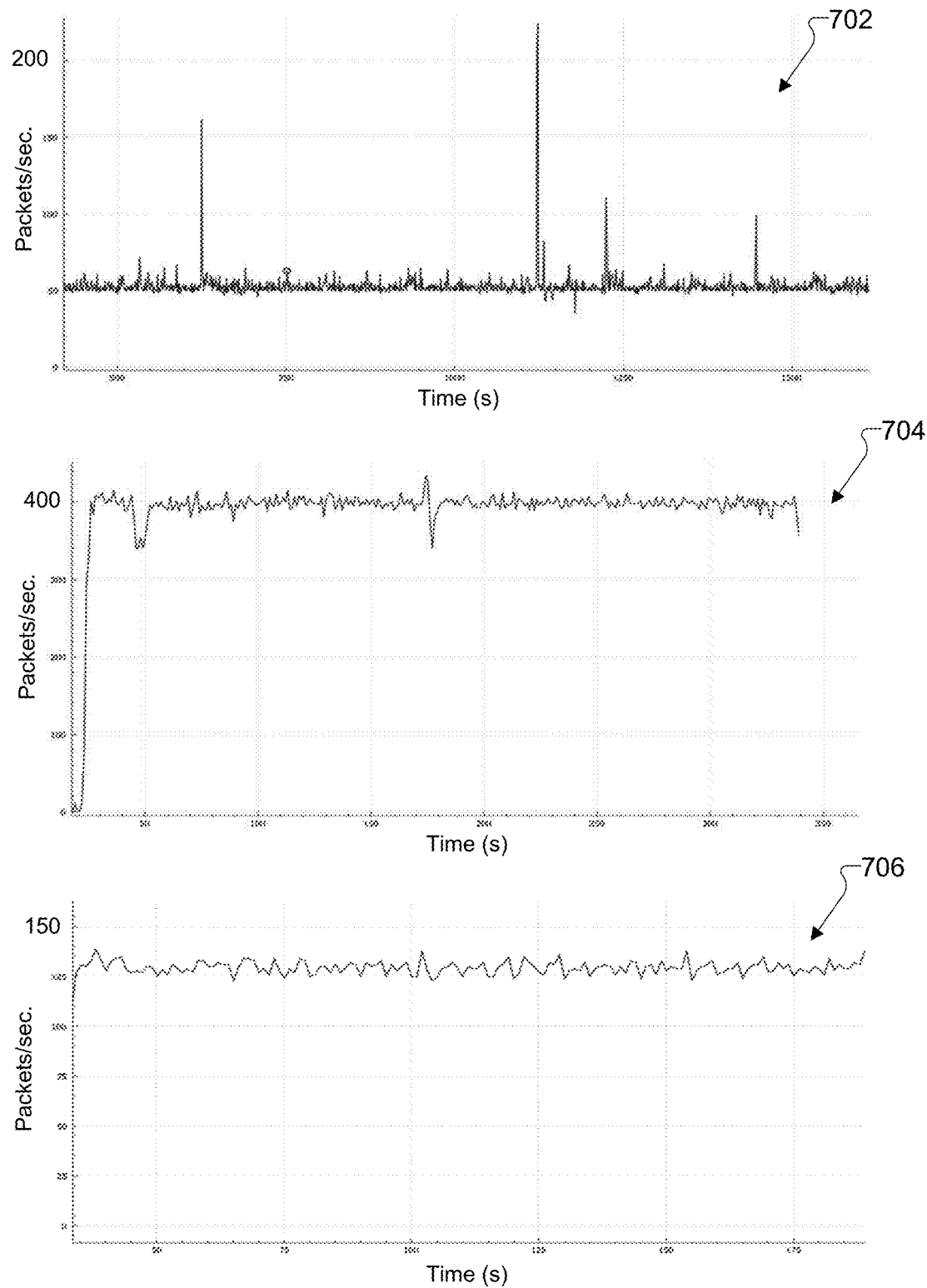
FIG. 7 illustrates examples of time sensitive traffic according to embodiments of the present disclosure.

FIG. 7 illustrates examples of time sensitive traffic according to embodiments of the present disclosure. Time-sensitive traffic needs to be processed or communicated as soon as it is received and can be associated with stable traffic applications like online gaming, and video and voice calls that create data at periodic intervals, where the periods are quite small. Typically, these periods are linked with the tick rate of the game or the frames per second (FPS) of a video call. Each of graphs 702, 704, and 706 is a graph of packets per second being generated (on the y-axis) vs. time in seconds (on the x-axis). Graph 702 illustrates an example of stable traffic generated by an online game (e.g., a smartphone game). Graph 704 illustrates an example of stable traffic generated by a video calling application. Graph 706 illustrates an example of stable traffic generated by an audio calling application.

Figure 8:
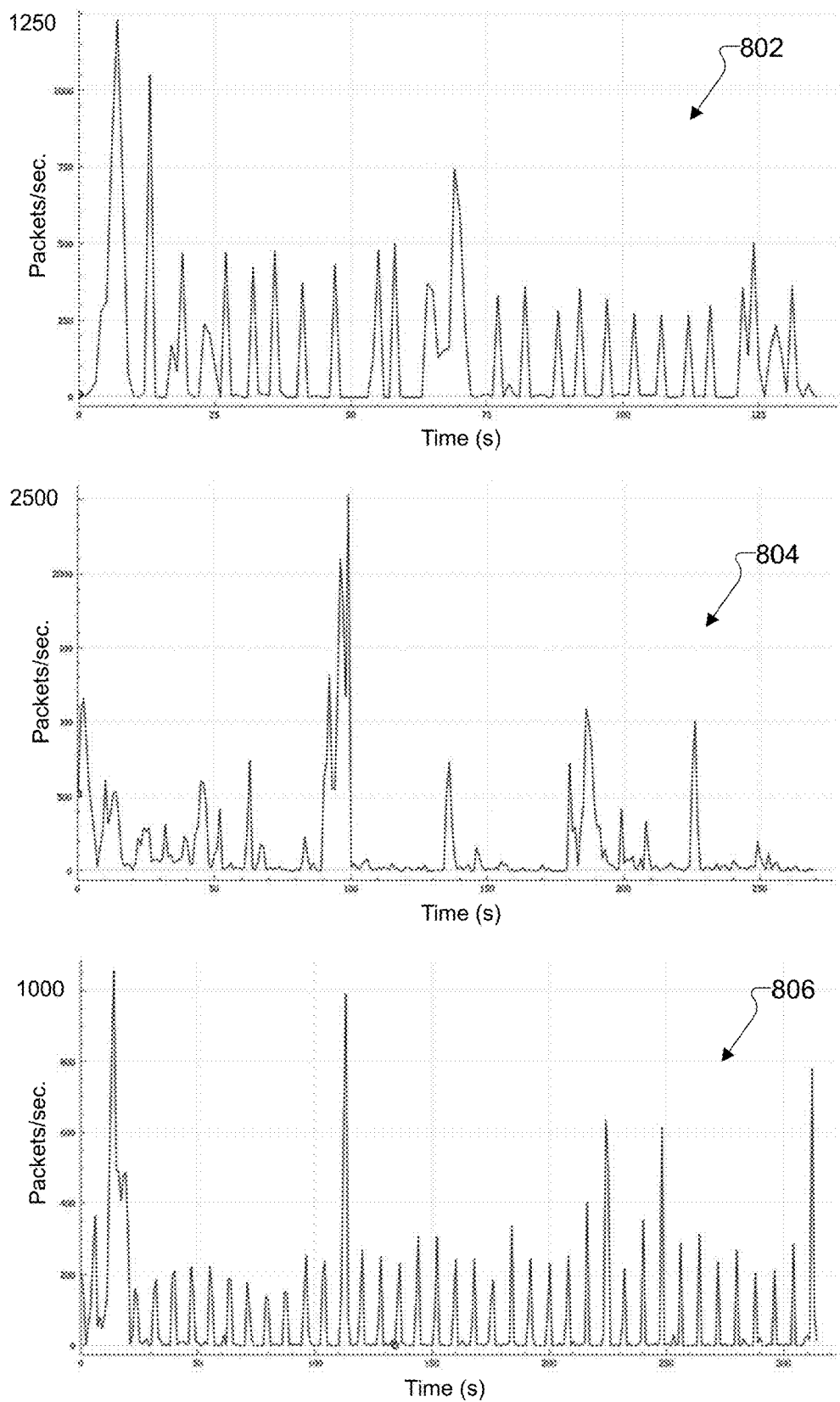
FIG. 8 illustrates examples of high throughput traffic according to embodiments of the present disclosure.

FIG. 8 illustrates examples of high throughput traffic according to embodiments of the present disclosure. Large amounts of data are communicated in periodic bursts or random bursts in these examples. Periodic bursts of traffic can occur, for example, in video sharing or over-the-top streaming applications using a read-ahead buffer which is updated quasi-periodically. Random bursts of traffic can occur, for example, in applications like web browsing, background updates, etc., that happen at random intervals in short bursts. Each of graphs 802, 804, and 806 is a graph of packets per second being generated (on the y-axis) vs. time in seconds (on the x-axis). Graph 802 illustrates an example of periodic burst traffic generated by a video sharing application. Graph 804 illustrates an example of random burst traffic generated by a web browsing application. Graph 806 illustrates an example of periodic burst traffic generated by an over-the-top streaming service.

Figure 9:
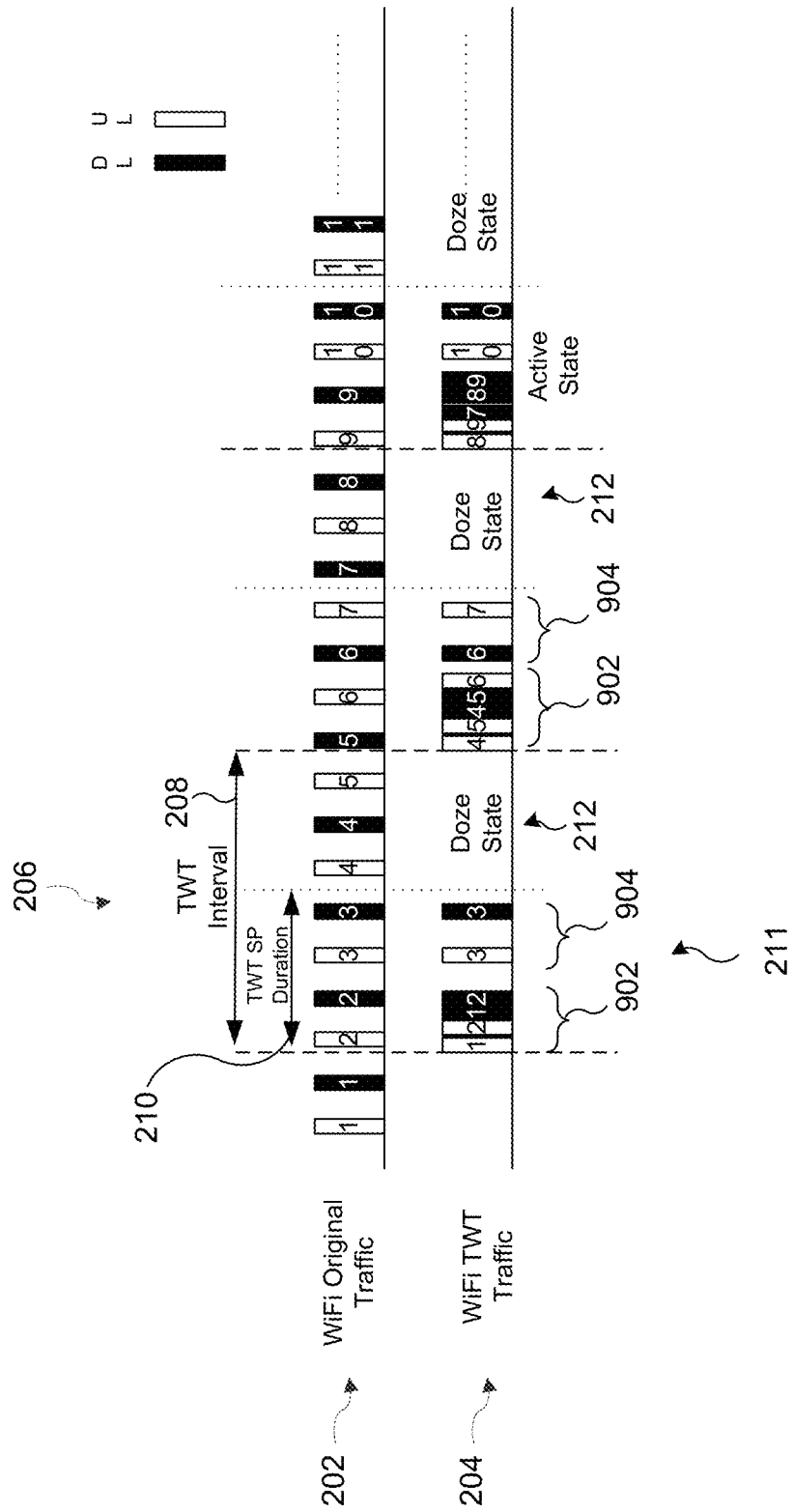
FIG. 9 illustrates an example of buffered and non-buffered packets in a TWT session according to various embodiments of the present disclosure.

In embodiments of the present disclosure, the selection of the TWT interval is dependent on the latency requirement of an application that generates traffic. The TWT SP duration is then a function of the number of packets to be delivered in the selected TWT interval and the time required to serve those packets in a buffered manner. As illustrated in FIG. 9, packets that arrive at the AP or that need to be transmitted to the AP from the STA during the doze state 212 within a given TWT session 206 are buffered until the next TWT session 206 starts at the AP and STA respectively. Additionally, packets that arrive at the AP or need to be sent from the STA while other packets are being served in the active state 211 of the TWT session 206 are also buffered at the AP and STA respectively. Therefore, there are buffered packets 902 (e.g., packets that are delayed at the AP or STA due to queueing of the previous packets) and non-buffered packets 904 (e.g., packets that are sent as soon as they arrive at the AP or are created at the STA). Embodiments of the present disclosure look at packets on the data link layer, but other embodiments can look at packets at the network layer and above as well.

As discussed above, a TWT session configuration includes a TWT interval and a TWT SP duration. The TWT interval can be in a range from about 15 ms to about 50 ms, and there are multiple ways to obtain the TWT interval. For example, the TWT interval can be calculated as the minimum time required by an application between two packets in either the UL or DL direction. In another example, where the data is not balanced in both the UL and DL directions, the TWT interval can be the minimum time required between two packets in the UL or DL direction. In a third example, any type of TWT interval estimation process can be used to calculate the TWT interval. Such example TWT interval estimation process may be based on the application latency requirement, the network traffic, or network conditions. In a fourth example, the TWT interval can be provided by the application running on the device (e.g., on the STA). In a fifth example, if the traffic is bursty and periodic (e.g., in some videos, the data period aligns to the frame rate), the TWT interval can be set to the traffic period.

Figure 10:
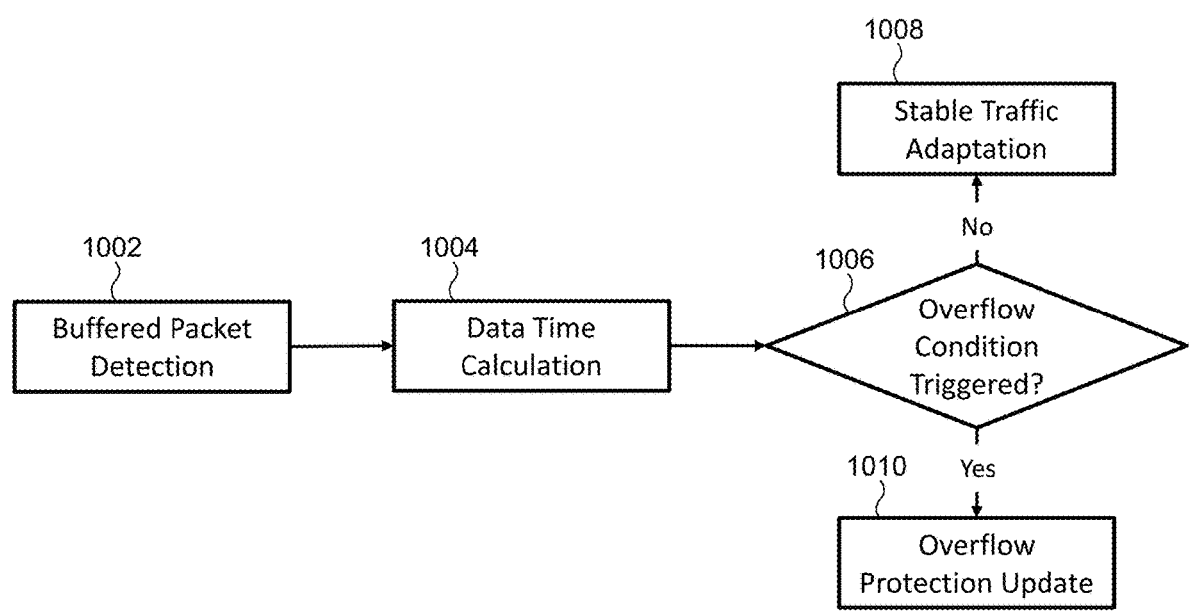
FIG. 10 illustrates an example of a three phase process for adaptively updating the TWT SP duration according to embodiments of the present disclosure.
Figure 11:
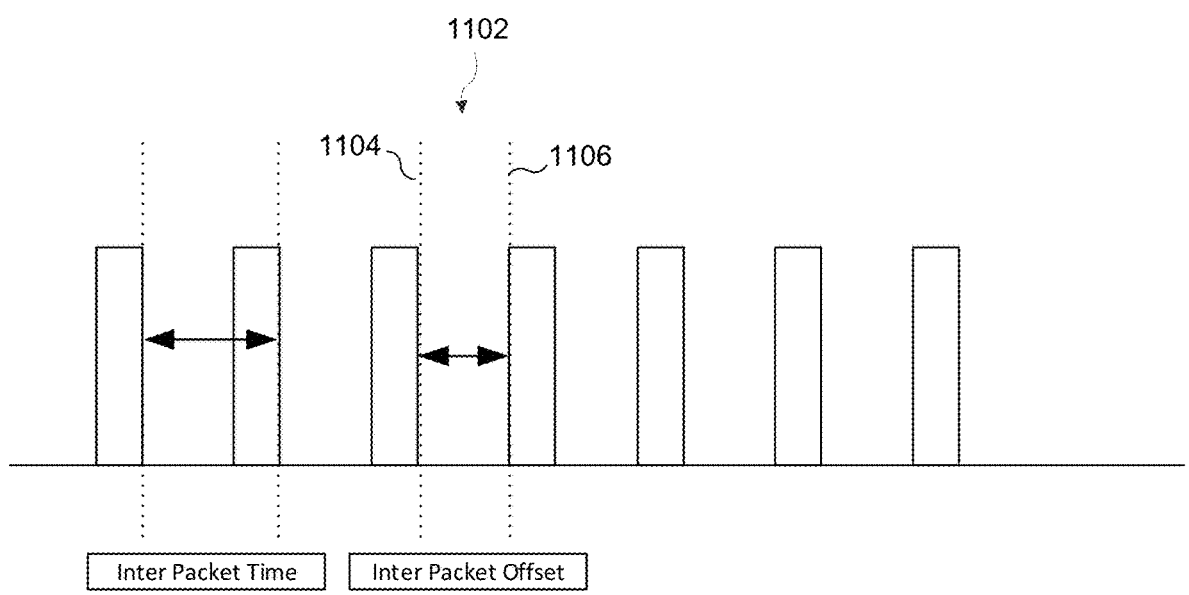
FIG. 11 illustrates an example of inter-packet offset and inter-packet time in accordance with various embodiments of the present disclosure.

Once a TWT interval is determined, a process for adaptively updating the TWT SP duration can be divided into three phases. FIG. 10 illustrates an example of a three phase process for adaptively updating the TWT SP duration according to embodiments of the present disclosure. First, buffered packet detection is performed, and packets are clustered into buffered and non-buffered packets (step 1002). Second, data time calculation is performed to find the data time required to transfer said packets based on prevailing network conditions, e.g., congestion, link speed, number of retries while transmitting packets, etc. (step 1004). Third, the TWT SP duration is adjusted for the following TWT sessions based on the calculated data time and the type of arriving traffic (e.g., stable or bursty), which can be referred to as traffic adaptation (steps 1006, 1008, and 1010). More specifically, if the arriving traffic is stable, the TWT SP duration may be updated periodically (step 1008), but if the arriving traffic is bursty (as determined at step 1006), the TWT SP duration may need to be updated rapidly to accommodate the incoming traffic (step 1010).

With respect to the buffered packet detection of step 1002, embodiments of the present disclosure use a determination of packet clustering to divide the packets in a TWT session into buffered and non-buffered packets. The packets are clustered based on their inter-packet offset 1102, illustrated in FIG. 11, which is defined as the time between the end timestamp 1104 of one packet and the beginning timestamp 1106 of another consecutive packet. The inter-packet offset 1102 does not include the airtime required to transmit the packet. However, the inter-packet offset 1102 includes time taken by contention, overheads and the actual wait time between the consecutive packets. If the packets that arrive are buffered, then the inter-packet offset 1102 should just include the time taken by contention (i.e. where the device waits for the chance to transmit or receive the packet) and overhead time (i.e. the time for control and management frames), whereas non-buffered packets will have a larger inter-packet offset 1102 due to the additional inclusion of actual wait time between the packets (i.e., the time until arrival of the next consecutive packet).

One exemplary process, or method, of clustering determination is designed to distinguish between buffered and non-buffered packets in a TWT session based on the inter-packet offset (e.g., inter-packet offset 1102). In normal operation of a WI-FI system, the inter-packet offset within a TWT session is a monotonically increasing function (e.g., since non-buffered packets will have a larger inter-packet offset due to the inclusion of the wait time). That is, the inter-packet offset monotonically increases in a TWT session. The exemplary clustering process uses this property of WI-FI systems to distinguish between buffered and non-buffered packets. The boundary between buffered and non-buffered packets is found when the inter-packet offset is greater than a clustering threshold $\epsilon$.

Figure 12:
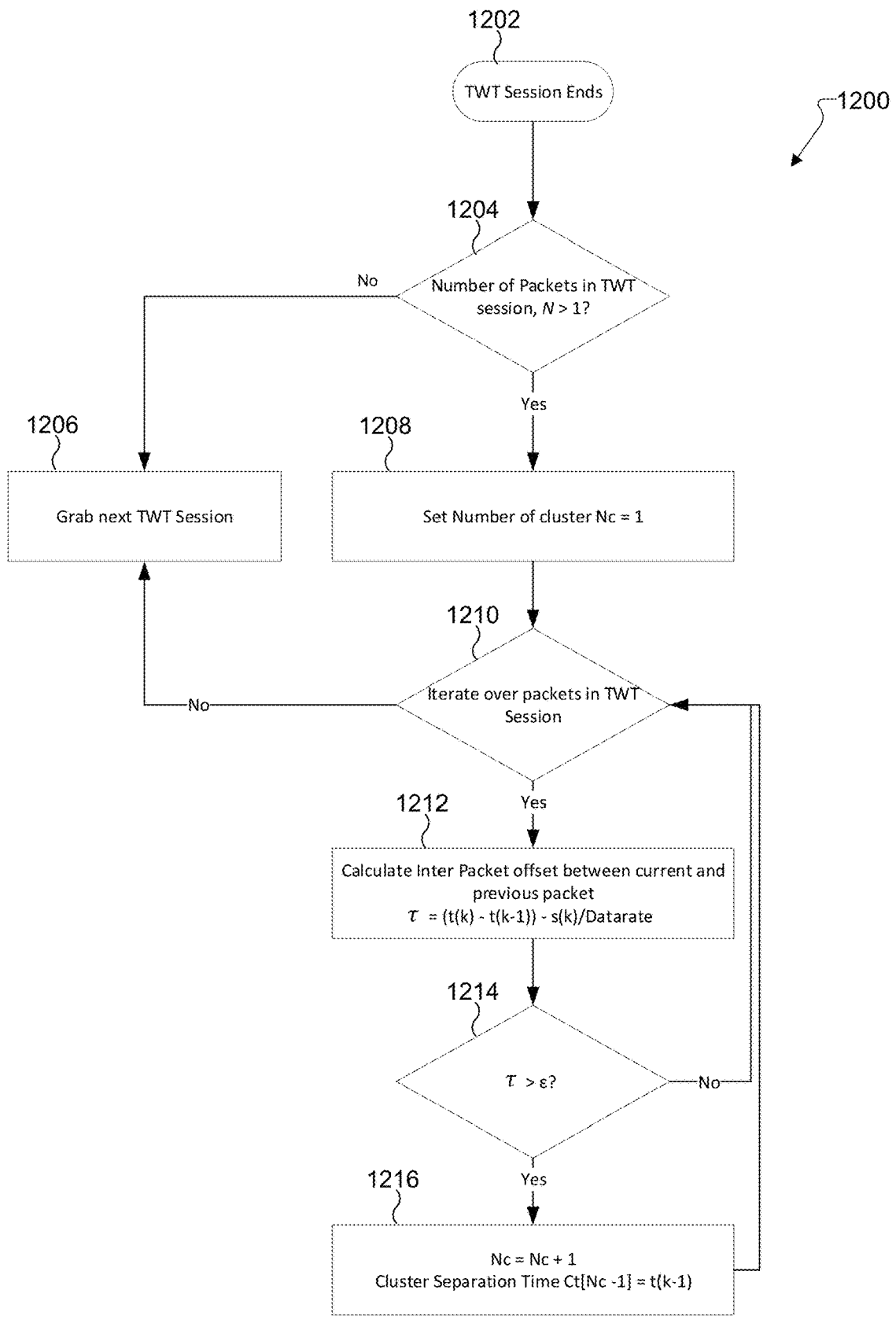
FIG. 12 illustrates an example process 1200 for packet clustering determination according to embodiments of the present disclosure.

FIG. 12 illustrates an example process 1200 for packet clustering determination according to embodiments of the present disclosure. The process 1200 may be performed by any suitable electronic device 101, such as a STA. In the process 1200, N is the total number of packets in a TWT Session, $N_c$ is the number of clusters, k is the packet counter/iterator variable, t(k) is the relative timestamp of packet k to the start of the TWT session, $\tau$ is the inter-packet offset, s(k) is the size of packet k, DataRate is the physical layer (PHY) data rate of the current wireless link, $\epsilon$ is the clustering threshold, and Ct is the time stamp of last packet of cluster $N_c$.

When a TWT session ends (step 1202), the process 1200 receives information on the number of packets N in the TWT session, the timestamp of the start of the TWT session and the timestamp of each packet k. A preliminary check is performed to determine if there was more than one packet in the TWT session (step 1204). If not, then the process moves to the next TWT session (step 1206). If there was more than one packet in the TWT session, then the process continues to step 1208, where the number of clusters $N_c$ is initialized to 1, and the packet counter variable k is initialized to 0.

Next, if the packet counter k is less than the total number of packets in the TWT session N, the process reads the timestamp information t(k) of the packet k and increments k by 1 (step 1210), then moves to step 1212. However, if the packet counter k is equal to the total number of packets in the TWT session N, this indicates that all packets in the TWT session have been considered, and the process moves to the next TWT session (step 1206).

At step 1212, the process calculates the inter-packet offset $\tau$ as follows. If k=1 (i.e., if this is the first packet in the TWT session):

$$\tau = (t(k)) - \frac{s(k)}{DataRate} \qquad (1)$$

Otherwise, if k>1:

$$\tau = (t(k) - t(k-1)) - \frac{s(k)}{DataRate} \qquad (2)$$

The process next checks if the calculated $\tau > \epsilon$ (step 1214). If not, then the process returns to step 1210 and calculates $\tau$ for the next packet. If $\tau > \epsilon$, then the process increments the number of clusters $N_c$ by 1, and appends the cluster separation time to Ct as $Ct[N_c-1]=t(k-1)$ (step 1216). The process then returns to step 1210 and calculates $\tau$ for the next packet. This iteration repeats until all packets in the TWT session have been considered.

As discussed above, the boundary between buffered and non-buffered packets is found when the inter-packet offset $\tau$ is greater than a clustering threshold $\epsilon$. The clustering threshold $\epsilon$ can be equated to the average contention time per packet and is a measure of the network conditions due to active communication from other WI-FI devices on the same channel. In essence, $\epsilon$ is a factor that represents the impact of other devices on the WI-FI channel to the operation of the device of interest (e.g., the STA that performs the embodiments of the present disclosure).

In various embodiments, the clustering threshold $\epsilon$ can be estimated using one or more of the following metrics. First, a ratio of the time that clear channel access (CCA) are busy to the total CCA time in a certain period. The ratio of CCA busy time to radio-on time can be used as approximation. This helps understand the channel utilization by other devices communicating on the same channel. Generally, $\epsilon$ increases with increasing ratio.

Second, a number of times the transmitted packets were retransmitted due to absence of an acknowledgement from the receiver (e.g., the AP). This helps understand the impact of interferers on the WI-FI channel. Generally, $\epsilon$ increases with increasing number of retransmission attempts.

Third, The rate of retransmission of the transmitted packets per unit of time. Generally, $\epsilon$ increases with increasing rate of retransmission of the transmitted packets per unit time.

Fourth, a ratio of retransmitted packets to successfully transmitted packets. Generally, $\epsilon$ increases with increasing rate of retransmission (e.g., since average contention time per packet increases with increasing rate of retransmission).

Fifth, a frequency band or bandwidth of the WI-FI channel that the AP and STA are communicating on. Generally, $\epsilon$ decreases as the frequency band or the bandwidth increases (e.g., since average contention time per packet decreases as frequency band or bandwidth increases).

Sixth, the number of APs on the channel. This can be determined by sending a probe request by the STA to other APs or passively listening to the beacons of the other APs. Generally, $\epsilon$ increases with increasing number of APs (e.g., since average contention time per packet increases with increasing number of APs).

Seventh, the number of STAs associated with current AP. This can be determined by the STA performing a network discovery over the local network provided by the AP. Generally, ϵ increases with increasing number of STAs (e.g., since average contention time per packet increases with increasing number of STAs).

Eighth, an estimated average of the difference between inter-packet time and packet airtime of the buffered or non-buffered packets. Generally, ϵ increases with increasing average of this difference (e.g., since average contention time per packet increases with increasing average of the difference).

In some embodiments, a lookup table is used to determine an ϵ value based on one or a combination of the metrics specified above. As an example, the parameters of a lookup table could be defined based on the ratio of CCA busy time to radio-on time (the first metric in the list above). In this case, if the ratio is less than 0.25, then ϵ is chosen as 1 millisecond, if the ratio lies between 0.25 and 0.5, then ϵ is chosen as 1.5 milliseconds, if the ratio lies between 0.5 and 0.75, then ϵ is chosen as 1.8 milliseconds, and if the ratio is larger than 0.75, then ϵ is chosen as 2.1 milliseconds. The values of ϵ presented above are merely examples. In other implementations, these values can change based on the metrics used, the capabilities of the WI-FI chipset, and the network interface used. If inter-packet time is used as the clustering feature instead of inter-packet offset, then the values will be different—ideally higher than these—and will depend on the PHY rate as they will include the airtime of the packet itself.

In other embodiments, a model can be formulated to calculate ϵ based on one or a combination of the metrics specified above. A simple example of the formulation can be:

$$\epsilon = \max(\min(\epsilon_{min} + \text{averageBuffTime}, \epsilon_{max}), \epsilon_{min}) \quad (3)$$

In equation (3), averageBuffTime is the estimated average of the difference between inter-packet time and packet airtime in buffered packets (the eighth metric in the list above), and $\epsilon_{min}$ and $\epsilon_{max}$ are the lower and upper bounds of ϵ, respectively. In one embodiment, $\epsilon_{min}$ is set to 1 ms and $\epsilon_{max}$ is set to 2.1 ms. If alternate values are used, more clusters can be generated and concatenated if $\epsilon_{min}$ is lower than 1 ms. If $\epsilon_{max}$ is larger than 2.1 ms, more non-buffered packets can be included to generate conservative clusters.

Once the clustering of process 1200 has been performed, the number of clusters and inter cluster separation time can be used to determine how many clusters provide information about the buffered packets. As the packets have monotonically increasing arrival/departure times, the end timestamp of the last packet in each cluster signifies the amount of time taken to communicate all the packets occurring in the cluster and the clusters before it. One or more clusters can be determined as containing the buffered data. In one embodiment, the first cluster is determined as containing the buffered data, and the arrival/departure of the last packet in the cluster is designated as the buffered packet communication time. In alternate embodiments, more clusters are used to signify buffered data in a similar manner.

Referring again to FIG. 10, with respect to the data time calculation step 1004, embodiments of the present disclosure use information on the identified buffered packets of a TWT session determined in step 1002 (for example using process 1200) to determine a data time for the TWT session. The data time for the TWT session is the time that would be required to transmit all of the packets (both buffered and non-buffered) in the TWT session in a buffered manner. That is, the data time is the time required to transmit all of the packets in the TWT session as though they were buffered. If all of the packets are able to be transmitted as though they are buffered, the time within the TWT session that the STA can be in a doze state or power save mode is maximized.

Figure 13:
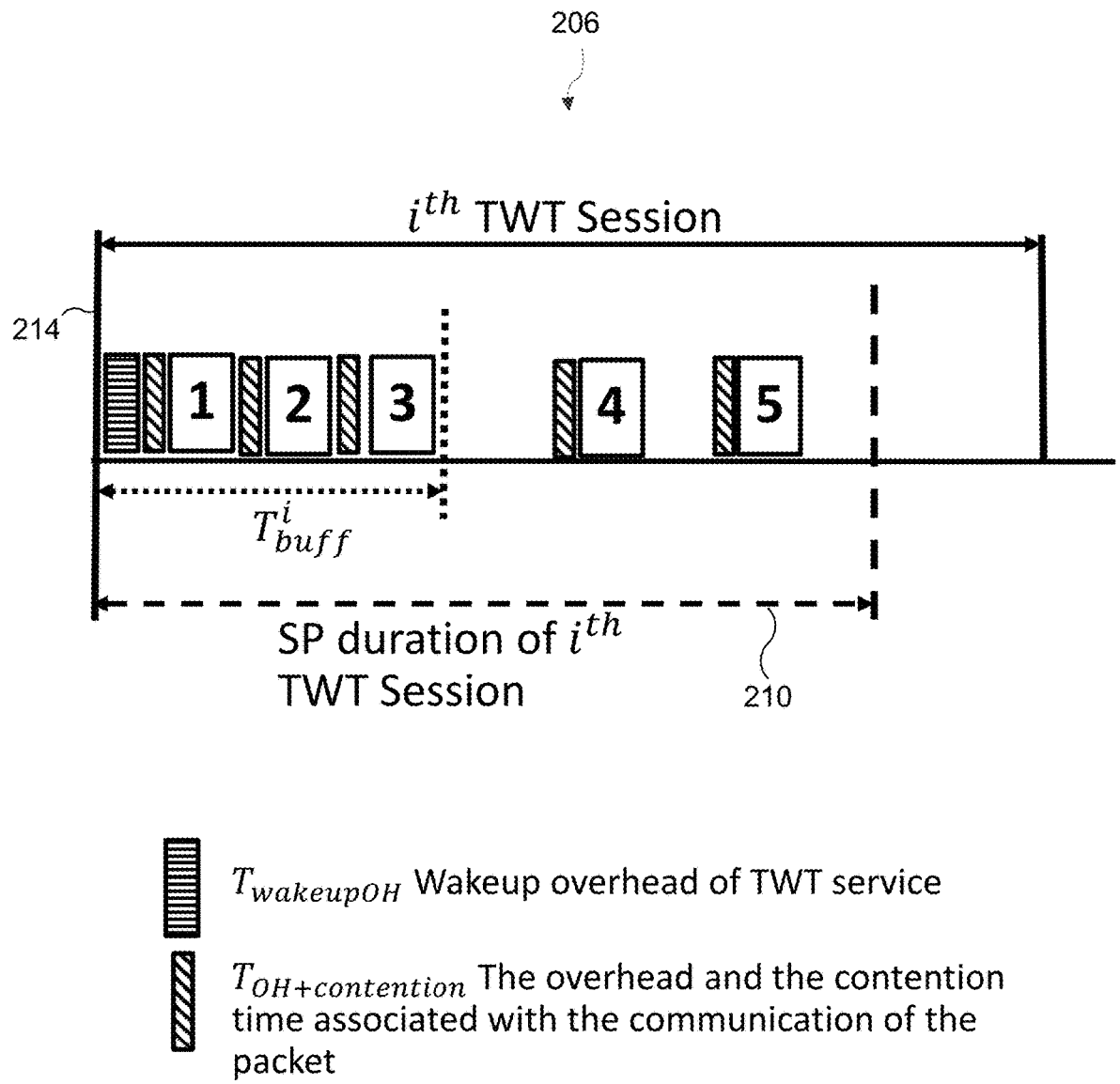
FIG. 13 illustrates an example of a TWT session used for a data time calculation process according to embodiments of the present disclosure.

FIG. 13 illustrates an example of a TWT session used for a data time calculation process according to embodiments of the present disclosure. In one simplified embodiment, the data time calculation can be performed using the timestamp of the end of the last packet in the buffered packets cluster $T_{buff}$ relative to the beginning timestamp of the TWT session, the number of buffered packets in the TWT session $N_{buff}$, and the total number of packets in the TWT session $N_{session}$. The data time, $T_d$, in one TWT session can then be formulated as:

$$T_d = N_{session} * \left( \frac{T_{buff}}{N_{buff}} \right) \quad (4)$$

In another embodiment, the data time calculation additionally takes into account the overhead associated with initiating communication between the AP and STA when a TWT session is started and the overhead and contention time associated with the communication of the packet. In this case, the data time is formulated as:

$$T_d = T^{avg}_{OH+contention} * N_{session} + \frac{\sum PktSize_{session}}{dataRate} + T_{wakeupOH} \quad (5)$$

where:

$$T^{avg}_{OH+contention} = \left( T_{buff} - \frac{\Sigma PktSize_{buff}}{dataRate} - T_{wakeupOH} \right) / N_{buff} \quad (6)$$

In equations 5 and 6, $T_{wakeupOH}$ is the wakeup overhead time of the TWT service, dataRate is the PHY data rate used to transmit the data packets, $PktSize_{buff}$ is a vector containing the size of the buffered packets $T^{avg}_{OH+contention}$ is the average of the overhead time and contention time for communication of all the buffered packets in the TWT session, and $PktSize_{session}$ is a vector containing the size of the packets in the session.

Figure 14:
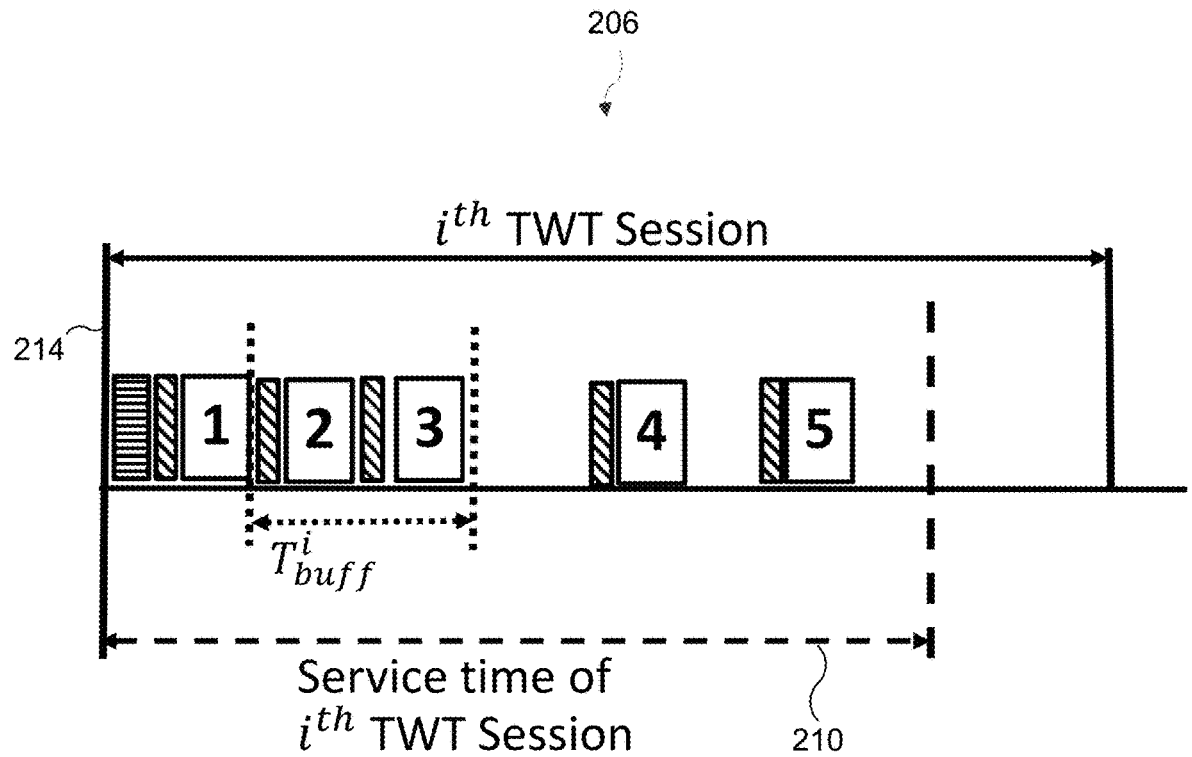
FIG. 14 illustrates an example of a TWT session used for a data time calculation process when the start time of the TWT session is unknown according to embodiments of the present disclosure.
Figure 14:
Figure 14:

In the embodiment of FIG. 13, the beginning time of the TWT session is known, however TWT can also function in an unannounced and non-triggered manner. In such cases, it may not be known when the TWT session begins. Accordingly, in another embodiment in which the starting time of the TWT session is unknown, $T_{buff}$ is calculated as the time between the timestamp of the end of the first packet in the session and the timestamp of the end of the last buffered packet, as illustrated in FIG. 14. In this case, the data time is still formulated as shown in equation 5, but the average of the overhead time and contention time for communication of all the buffered packets in the TWT session is formulated as:

$$T^{avg}_{OH+contention} = \left( T_{buff} - \frac{\sum_{1}^{N_{buff}-1} PktSize_{buff}}{dataRate} - T_{wakeupOH} \right) / (N_{buff} - 1) \quad (7)$$

In the special case where there are 2 or less packets in the TWT session, the $T^{avg}_{OH+contention}$ calculated from previous TWT sessions can be reused.

In the above embodiments, the packet communication overhead is ideally due to the request-to-send (RTS), clear-to-send (CTS) and Block-Ack per packet in the WI-FI MAC layer. With reference to the example of FIG. 13, if the packet communication overhead is treated as a constant, then the average congestion time $T_{contention}^{avg}$ can be calculated as:

$$T_{contention}^{avg} = \left(T_{buff} - \frac{\sum PktSize_{buff}}{dataRate * scale} - T_{wakeupOH}\right) / N_{buff} \quad (8)$$

and the data time can be formulated as:

$$T_d = T_{contention}^{avg} * N_{session} + \frac{\sum PktSize_{session}}{dataRate * scale} + T_{wakeupOH} \quad (9)$$

In equations 8 and 9, $T_{contention}^{avg}$ is the average contention time calculated in the TWT session from the buffered packets, and the scale factor (scale) is applied to account for the constant packet overhead. The scale factor also signifies the factor by which the actual throughput differs from the PHY data rate. Specifically, the scale factor depends on the efficiency of the layer that the algorithm is running on. If the algorithm is running on the MAC layer, then the scale factor can be related to the MAC efficiency of the protocol being used, e.g. 65 to 85%, so the scale factor can be 0.65-0.85. If the algorithm is implemented at layer 3 or the IP layer, then the scale factor can range from 0.5-0.85. The scale factor can also be derived empirically by collecting data from the device to make it more device specific.

Another example embodiment of data time calculation can be used with packets in the network layer and above. As network layer packets are created independent of the WI-FI chipset, the patterns used to determine buffered and non-buffered packets cannot be observed on uplink packets on the device. These patterns are only observed on the downlink packets as their delivery depends on the TWT session parameters. In this example, the above embodiments of data time calculation can be utilized only for the downlink network layer and above packets. This embodiment and all other embodiments discussed with respect to the data time calculation step 1004 can be combined improve the accuracy of the data time calculation.

Referring again to FIG. 10, with respect to the traffic adaptation phase of the process for adaptively updating the TWT SP duration, which comprises steps 1006, 1008, and 1010, embodiments of the present disclosure use the data time information as determined in step 1004 to estimate a new TWT SP duration. In one embodiment, a contiguous observation window of size N TWT sessions is evaluated, and the average data time $T_{avg}$ and the maximum data time $T_{max}$ over the observation window are determined. Based on these values, an overflow condition is defined, and based on the overflow condition, it can be determined whether the TWT SP duration will be updated in a periodic (or stable) update or whether an overflow protection update is required, in which case the TWT SP duration is updated more rapidly.

Figure 15:
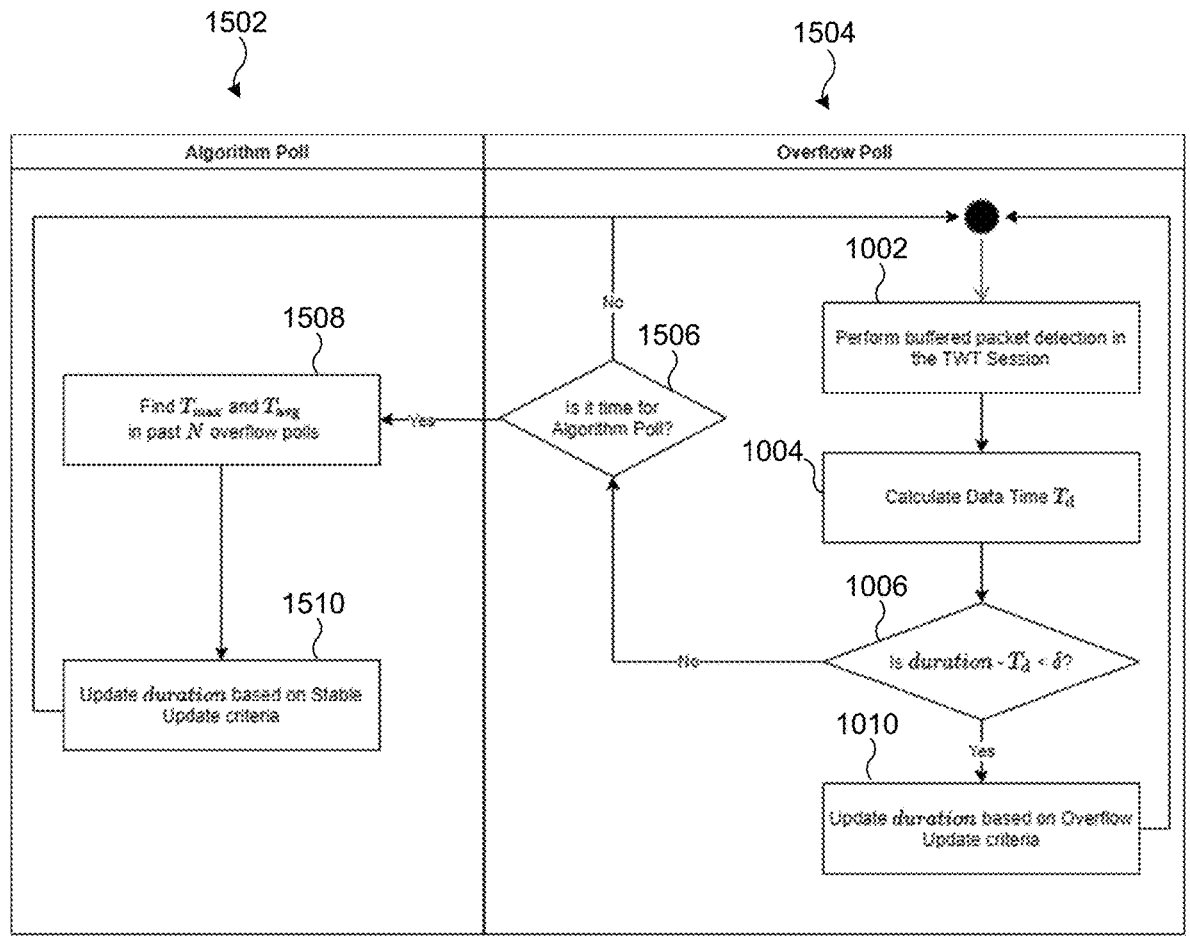
FIG. 15 illustrates an example of the three phase process for adaptively updating the TWT SP duration, with additional detail of an example process for the traffic adaptation phase according to embodiments of the present disclosure.

FIG. 15 illustrates an example of the three phase process for adaptively updating the TWT SP duration similar to FIG. 10, with additional detail of an example process for the traffic adaptation phase according to embodiments of the present disclosure. In FIG. 15, the traffic adaptation phase is divided into two polling operations: an algorithm poll 1502 (representing the stable TWT SP duration update, or stable traffic adaptation step 1008 of FIG. 10) and an overflow poll 1504 (representing the overflow protection TWT SP duration update, or overflow protection update 1010 of FIG. 10).

The overflow poll 1504 happens at a fast rate, for example every TWT session or at an integral multiple of TWT sessions. The algorithm poll 1502 or stable update happens at a slower rate, for example every N overflow polls, where N is the observation window size. Decision block 1506 represents a check after each overflow poll 1504 to determine whether to perform a stable update. In some embodiments N could be set to 50 (although this can be generalized to any number, e.g., 40 to 60).

Figure 16:
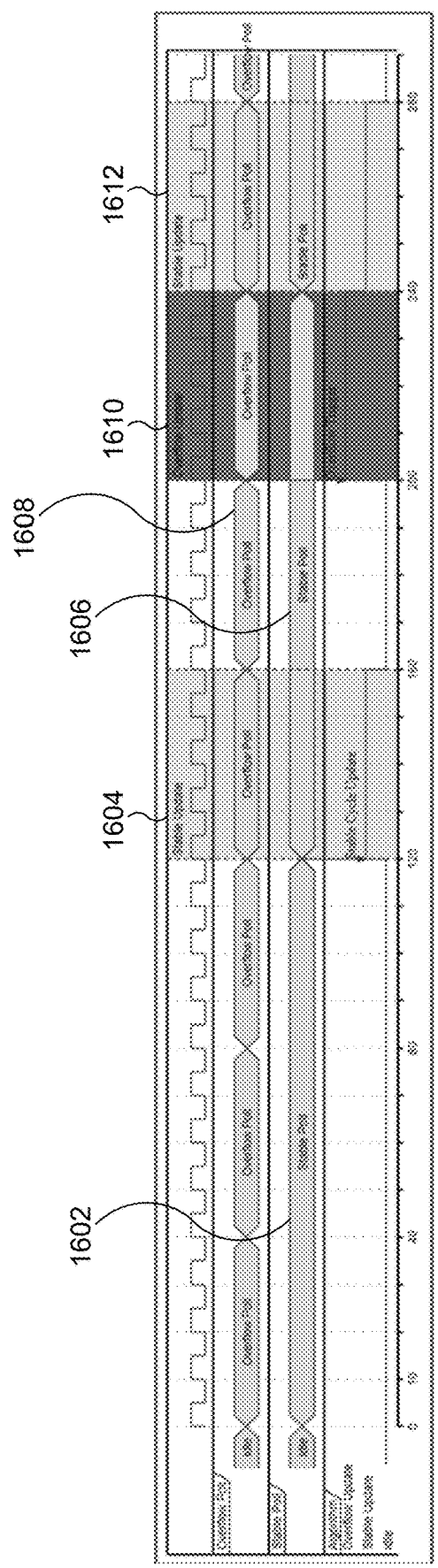
FIG. 16 illustrates an example scenario of stable updates and overflow updates according to embodiments of the present disclosure.

An example is illustrated in FIG. 16, in which an overflow poll occurs every 40 ms, and an algorithm poll (or Stable Poll) has a window of N=3 overflow polls. In the example of FIG. 16, no overflow poll is triggered in the initial algorithm poll 1602 (or Stable Poll, e.g., between 1 ms and 120 ms) and there is a stable update 1604 (e.g., between 120 ms and 160 ms). In the second Stable Poll 1606 (e.g., between 120 ms and 240 ms), an overflow condition is found in overflow poll 1608 and an overflow protection update 1610 is triggered (Overflow Update, e.g., between 200 ms and 240 ms), then a second stable update 1612 occurs (e.g., between 240 ms and 280 ms).

Returning to FIG. 15, a stable update happens when the arriving traffic is mostly even and does not deviate much from the past trends in the observation window. The stable update is analogous to a maximum envelope tracker of the past traffic. In one embodiment, the stable update tracks $T_{max}$, and whenever a new $T_{max}$ is found in the observation window, a stable update occurs. Additionally or alternatively, the stable update can be performed at a slower pace after every N TWT sessions, or after some multiple of N TWT sessions. During a stable update 1502, $T_{max}$ and $T_{avg}$ are reevaluated for the past N TWT sessions (or overflow polls) at step 1508, and the TWT parameters are renegotiated with the AP at step 1510, with an updated TWT SP duration that is determined based on one or both of $T_{max}$ and $T_{avg}$, with a stable update guard time added. A stable update guard is required to accommodate for any errors in the data time estimation, or any variance in the incoming data. In addition, the guard provides enough time to accommodate for an increase in the number of arriving packets.

The stable update guard time α is formulated as a function of the TWT session parameters and the level of the contention in the channel (to account for network conditions). An average contention time factor ϵ is used to represent the level of contention. In one embodiment, the stable guard time is formulated as a percentage of the TWT interval. This percentage is based on the value of ϵ. The percentage can be formulated as a function of ϵ, or can be determined from a lookup table based on the value of ϵ. In one embodiment, the stable update guard time is formulated as:

$$\alpha = p(\epsilon) * \text{interval} \quad (10)$$

Where interval is the TWT interval and p is a function or lookup table that assigns a percentage based on ϵ. The value of p(ϵ) in some is empirically derived as 5% when ϵ is less than 1.8 ms and 10% when ϵ is larger than 1.8 ms.

In alternate embodiments, the stable update guard time α can be calculated using a combination of TWT interval and TWT SP duration. In the case that α<ϵ, the stable update guard time is assigned as α=ϵ. A combination of these embodiments can also be used to perform the stable update.

Once the stable guard time has been determined, the final TWT SP duration value for the TWT session is calculated as:

$$\text{duration} = T_{max} + \alpha \quad (11)$$

In an alternative embodiment, the average data time over the observation window is used instead of the maximum data time, and the final TWT SP duration value for the TWT session is calculated as:

$$\text{duration} = T_{avg} + \alpha \quad (12)$$

In another alternative embodiment, both the average data time and the maximum data time over the observation window are used, and the final TWT SP duration value for the TWT session is calculated as:

$$\text{duration} = x \cdot T_{max} + (1-x) \cdot T_{avg} + \alpha, x \in [0,1] \quad (13)$$

Where x is a contribution metric which can be adjusted to decrease or increase the impact of $T_{max}$ and $T_{avg}$ on the TWT SP duration. A contribution metric is determined by the ability of the application being served to accept a lower effective throughput and a lenient latency requirement. If the latency requirement or effective throughput requirement of the application is high, then x will be equal to 1 or close to 1 to maximize the impact from $T_{max}$. If the application can tolerate a lower effective throughput or the latency requirement is more lenient, x can be closer to 0.5, and impact from $T_{max}$ and $T_{avg}$ is equal or roughly equal. For example, for stable traffic applications, the ratio of $T_{max}$ to $T_{avg}$ is smaller as compared to bursty traffic applications, where the ratio can be quite large. However, stable traffic applications have a strict latency requirement compared to bursty traffic applications, so x can be formulated as $x = 1/(T_{max}/T_{avg})$.

In another alternative embodiment, when a TWT session negotiation is initiated between the AP and STA after previously having no TWT session negotiated, the TWT SP duration can be calculated as:

$$\text{duration} = \frac{T_d}{T_{obs}} \ast \text{interval} + \alpha \quad (14)$$

Where $T_{obs}$ is the observation time during which the data time $T_d$ is calculated. When the TWT interval value is updated, $T_{obs}$ is the old TWT interval value and $T_d$ is scaled by a ratio of the new TWT interval to the old TWT interval.

As an alternative to the above embodiments for calculation of the new TWT SP duration in a stable update, a new TWT SP duration may be calculated using a Poisson process. For a latency sensitive application, there may be a constant stream of packets flowing between the STA and AP. The packets arrive according to a random process which can be modeled as a Poisson process. The model requires the knowledge of λ, which is the arrival rate of packets per second. Given an interval I and a mean inter packet arrival rate of θ, the arrival rate can be calculated as:

$$\lambda = \frac{I}{\theta} \quad (15)$$

Then, to create a guard similar to the stable update to adjust for any additional packets by adding 2 times the standard deviation, the new TWT SP duration can be formulated as:

$$\text{duration} = (\lambda + 2\sqrt{\lambda}) \ast \left(\epsilon \ast \frac{PktSize_{avg}}{DataRate}\right) + T_{wakeupOH} \quad (16)$$

Where $PktSize_{avg}$ is the average packet size in the packet stream, $\epsilon$ is the average contention time per packet, $T_{wakeupOH}$ is the wakeup overhead related with TWT operation, and DataRate is the PHY data rate used to transmit the packets.

Overflow protection is important for data that arrives in bursts. When the burst of data comes in, the TWT SP duration needs to be adjusted quickly, and overflow protection allows for scaling the TWT SP duration quickly in the case of large incoming data to prevent the link from saturating below its capability due to TWT. This protection is integral for applications like web browsing, video streaming, and the like, where data comes in the form of periodic and aperiodic bursts while at other times there is no traffic present. As the stable update happens at a slower rate, overflow protection can be used to adjust the TWT SP duration faster and more quickly to adapt to incoming large traffic. This is extremely important as, for example, TCP Congestion Control may settle at a lower sending rate if the link does not adapt quickly.

Overflow protection is triggered by an overflow condition that is evaluated at a rate different than the stable update rate, as discussed above. In one embodiment, overflow polling 1504 checks the overflow protection criteria (at step 1006) at the end of every TWT session. In another embodiment, overflow polling 1504 checks the overflow protection criteria after 2 or more TWT sessions. In a third embodiment, the rate of evaluating the overflow protection can depend on the value of the TWT interval and TWT SP duration, e.g., for shorter TWT intervals the overflow condition is evaluated every other TWT session. In alternative embodiments, successive overflow triggers can be evaluated to execute the overflow protection.

The data time of the latest TWT session, $T_d$, as determined at step 1004, is used to evaluate the overflow condition at step 1006. The overflow condition used can be a combination of one or multiple of the following criteria. First, whether $T_d - T_{max}$ is greater than some predetermined threshold. Under this criterion, an overflow update is triggered when the latest data time is greater than the maximum data time of the previous N TWT sessions by some threshold.

Second, whether $T_d - T_{avg}$ is greater than some predetermined threshold. Under this criterion, an overflow update is triggered when the latest data time is greater than the average data time of the previous N TWT sessions by some threshold.

Third, whether $\text{duration} - T_d$ is less than a very small threshold (e.g., δ). Under this criterion, an overflow update is triggered when the latest data time comes very close to the current negotiated TWT SP duration.

In an embodiment using the third criterion, a threshold δ is determined as a fraction of the current negotiated TWT SP duration, of the current TWT interval, or a combination of both. For a small TWT SP duration and TWT interval, the threshold is instead set as δ=ε, the average contention time, as the percentage of the TWT SP duration used as the threshold may not be sufficient enough for any packets to be transmitted/received, causing the trigger to fail. For other cases, δ is empirically derived as 10% of the TWT SP duration.

In one embodiment, during the overflow protection update 1010, an updated TWT SP duration is determined as an integer multiple of $T_{max}$ with an overflow update guard β added. The overflow update guard β can be formulated similar to the stable update guard α, but can be any fraction higher than the stable guard update depending on how fast the TWT SP duration needs to adapt to the incoming traffic. For example, the overflow update guard β can be formulated as:

$$\beta = p_{overflow}(\epsilon) \ast \text{interval} \quad (17)$$

Where $p_{overflow}$ low is a lookup table or function or a function that determines a value based on the value of $\epsilon$. The new TWT SP duration can then be calculated as:

$$\text{duration} = L * T_{max} + \beta \tag{18}$$

Where L is an integer multiple that is chose based on how quickly the TWT SP duration needs to adapt to traffic changes. In one embodiment, L=1 and $p_{overflow}$=20%. These values are obtained by simulation results. These factors control how fast or how slow the overflow protection responds to the incoming burst traffic. As the amount of incoming traffic is not known, these values are chosen because they will not teardown TWT easily but they will also adapt to traffic so as not to saturate active TCP connections. Higher L values will allow TWT teardown much faster, and different $p_{overflow}$ will allow finer or coarser adjustment to the TWT SP duration when overflow is detected. For faster teardown and conservative operation, L=2 and $p_{overflow}$=40% can be used.

Figure 17A:
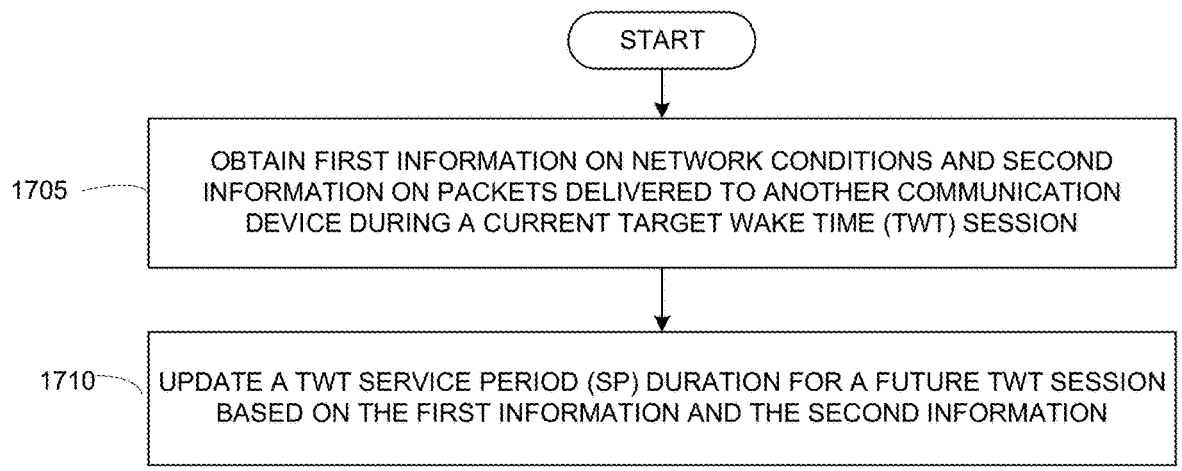
FIGS. 17A-17C illustrate example processes for adaptively adjusting TWT SP duration in accordance with various embodiments of the present disclosure.
Figure 17B:
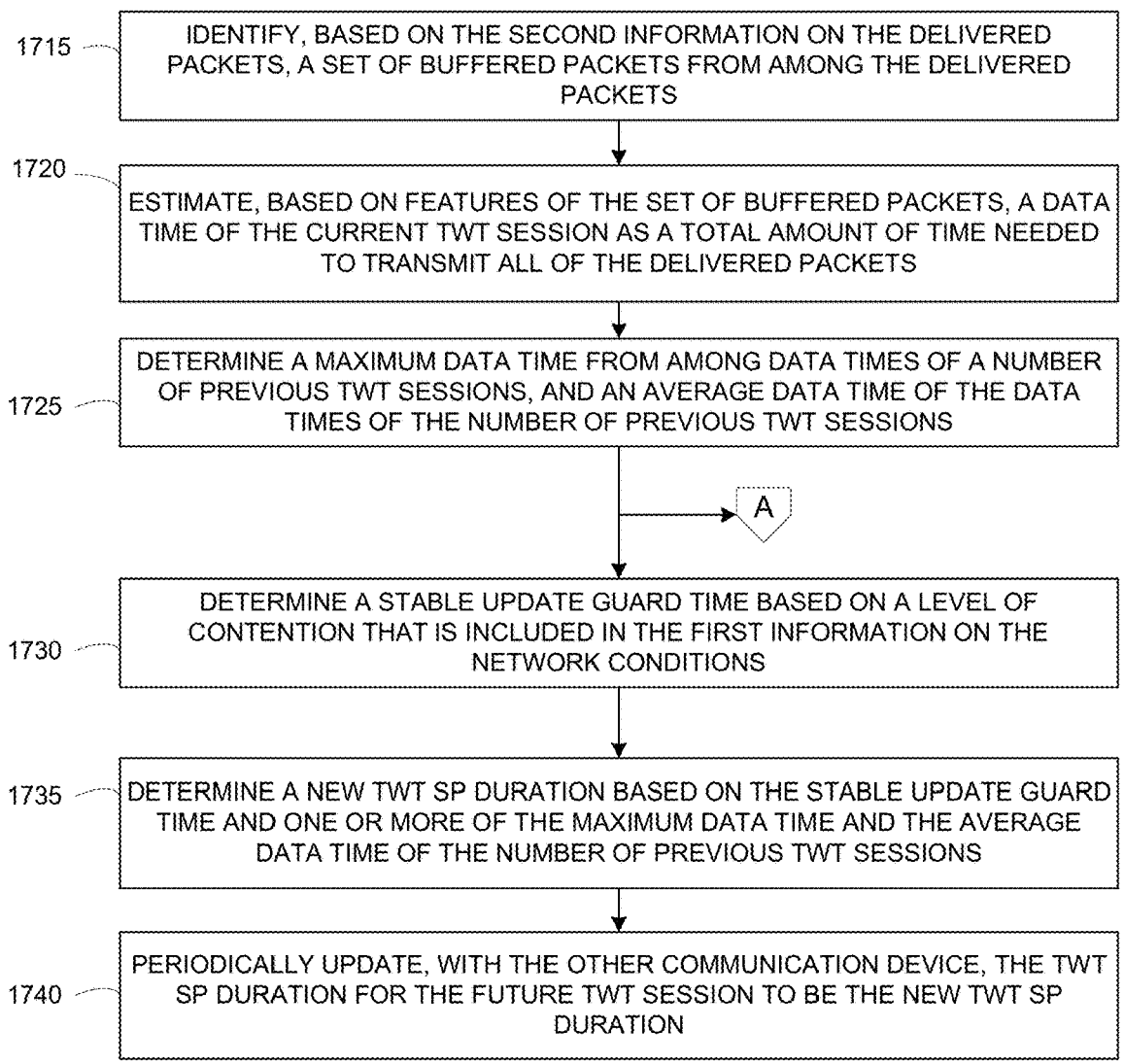
Figure 17C:
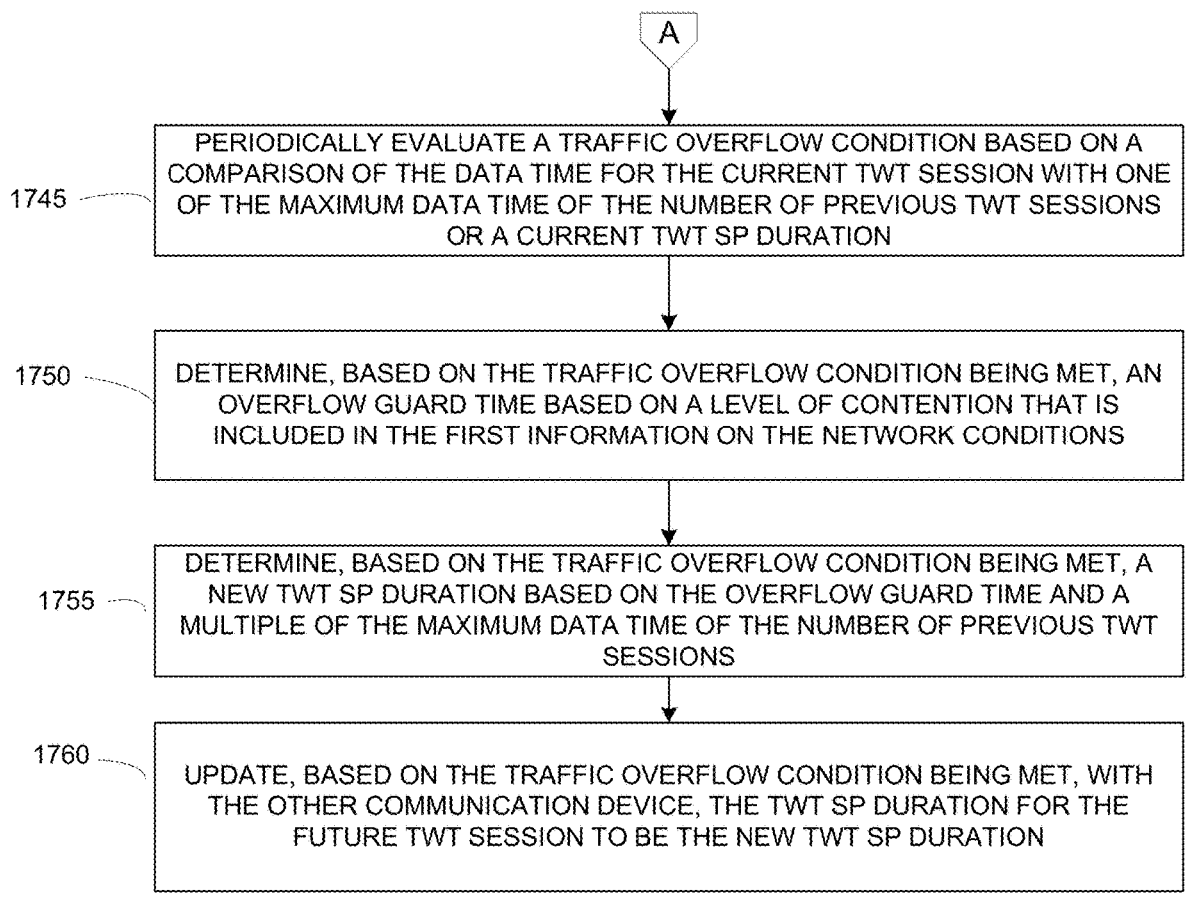

FIGS. 17A-17C illustrate example processes for adaptively adjusting TWT SP duration in accordance with various embodiments of the present disclosure. For convenience, the processes of FIGS. 17A-17C are discussed as being performed by a WI-FI STA, but it is understood that any suitable wireless communication device could perform these processes.

Referring to FIG. 17A, the process begins with the STA obtaining first information on network conditions and second information on packets delivered to another communication device (e.g., an AP) during a current TWT session (step 1705). The first information can include, for example, the information discussed above with respect to calculation of a clustering threshold. The second information can include, for example, beginning and end timestamps for each packet transmitted in the current TWT session.

Next, the process updates a TWT SP duration for a future TWT session based on the first information and the second information (step 1710). FIGS. 17B and 17C discuss this step in more detail.

With respect to FIG. 17B, after step 1705, the process identifies, based on the second information on the delivered packets, a set of buffered packets from among the delivered packets (step 1715). This can include estimating a clustering threshold based on the first information on the network conditions, and identifying the set of buffered packets based on a comparison of an inter-packet offset between adjacent delivered packets (which can be with the clustering threshold, such that, starting from a beginning timestamp of the current TWT session, each subsequent packet is added to the set of buffered packets until a packet is found for which the inter-packet offset with a previous adjacent packet is greater than the clustering threshold.

Next, the process estimates based on features of the set of buffered packets, a data time of the current TWT session as a total amount of time needed to transmit all of the delivered packets (step 1720). This can include determining the features of the set of buffered packets, including a number of the buffered packets and a time duration from a beginning timestamp of the current TWT session to an ending timestamp of a last buffered packet in the set of buffered packets, determining a total number of the delivered packets, and estimating the data time for the current TWT session based on the total number of the delivered packets, the number of the buffered packets, and the time duration from the beginning timestamp of the current TWT session to the ending timestamp of the last buffered packet in the set of buffered packets.

Then, the process determines determining a maximum data time from among data times of a number of previous TWT sessions, and an average data time of the data times of the number of previous TWT sessions (step 1725).

Next, in a first embodiment, the process determines a stable update guard time based on a level of contention that is included in the first information on the network conditions (step 1730). The process then determines a new TWT SP duration based on the stable update guard time and one or more of the maximum data time and the average data time of the number of previous TWT sessions (step 1735).

Finally, the first embodiment of the process periodically updates, with the other communication device, the TWT SP duration for the future TWT session to be the new TWT SP duration (step 1740). This can include, for example, negotiating the TWT SP duration with the other device.

Referring now to FIG. 17C, after step 1725, the process, in a second embodiment, periodically evaluates a traffic overflow condition based on a comparison of the data time for the current TWT session with one of the maximum data time of the number of previous TWT sessions or a current TWT SP duration (step 1745). The traffic overflow condition can, in some embodiments, be evaluated after every TWT session. The traffic overflow condition can be met when the data time for the current TWT session is greater than the maximum data time of the number of previous TWT sessions by a first predetermined threshold amount, or when the data time for the current TWT session is within a second predetermined threshold amount of the current TWT SP duration, wherein the second predetermined threshold amount is based on the first information on the network conditions.

When the traffic overflow condition is met, the process determines an overflow guard time based on a level of contention that is included in the first information on the network conditions (step 1750). The process can then determine a new TWT SP duration based on the overflow guard time and a multiple of the maximum data time of the number of previous TWT sessions (step 1755). Finally, the second embodiment of the process updates, with the other communication device, the TWT SP duration for the future TWT session to be the new TWT SP duration (step 1760).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A communication device comprising:
a processor configured to:
obtain first information on network conditions and second information on packets delivered to another communication device during a current target wake time (TWT) session;
identify, based on the second information on the delivered packets, a set of buffered packets from among the delivered packets;
estimate, based on features of the set of buffered packets, a data time of the current TWT session as a total amount of time needed to transmit all of the delivered packets; and
update a TWT service period (SP) duration for a future TWT session based on the first information and the data time.

2. The communication device of claim 1, wherein the processor is further configured to:
estimate a clustering threshold based on the first information on the network conditions; and
identify the set of buffered packets based on a comparison of an inter-packet offset between adjacent delivered packets with the clustering threshold, such that, starting from a beginning timestamp of the current TWT session, each subsequent packet is added to the set of buffered packets until a packet is found for which the inter-packet offset with a previous adjacent packet is greater than the clustering threshold.

3. The communication device of claim 1, wherein the processor is further configured to:
determine the features of the set of buffered packets, including a number of the buffered packets and a time duration from a beginning timestamp of the current TWT session to an ending timestamp of a last buffered packet in the set of buffered packets; and
determine a total number of the delivered packets,
wherein the estimated data time for the current TWT session is based on the total number of the delivered packets, the number of the buffered packets, and the time duration from the beginning timestamp of the current TWT session to the ending timestamp of the last buffered packet in the set of buffered packets.

4. The communication device of claim 3, wherein the processor is further configured to:
determine a maximum data time from among data times of a number of previous TWT sessions, and an average data time of the data times of the number of previous TWT sessions;
determine a stable update guard time based on a level of contention that is included in the first information on the network conditions;
determine a new TWT SP duration based on the stable update guard time and one or more of the maximum data time and the average data time of the number of previous TWT sessions; and
periodically update, with the other communication device, the TWT SP duration for the future TWT session to be the new TWT SP duration.

5. The communication device of claim 3, wherein the processor is further configured to:
determine a maximum data time from among data times of a number of previous TWT sessions;
periodically evaluate a traffic overflow condition based on a comparison of the data time for the current TWT session with one of the maximum data time of the number of previous TWT sessions or a current TWT SP duration;
determine, based on the traffic overflow condition being met, an overflow guard time based on a level of contention that is included in the first information on the network conditions;
determine, based on the traffic overflow condition being met, a new TWT SP duration based on the overflow guard time and a multiple of the maximum data time of the number of previous TWT sessions; and
update, based on the traffic overflow condition being met, with the other communication device, the TWT SP duration for the future TWT session to be the new TWT SP duration.

6. The communication device of claim 5, wherein:
the processor is further configured to evaluate the traffic overflow condition after every TWT session, and
the traffic overflow condition is met when:
the data time for the current TWT session is greater than the maximum data time of the number of previous TWT sessions by a first predetermined threshold amount, or
the data time for the current TWT session is within a second predetermined threshold amount of the current TWT SP duration, wherein the second predetermined threshold amount is based on the first information on the network conditions.

7. A method for wireless communication, comprising:
obtaining first information on network conditions and second information on packets delivered to another communication device during a current target wake time (TWT) session;
identifying, based on the second information on the delivered packets, a set of buffered packets from among the delivered packets;
estimating, based on features of the set of buffered packets, a data time of the current TWT session as a total amount of time needed to transmit all of the delivered packets; and
updating a TWT service period (SP) duration for a future TWT session based on the first information and the data time.

8. The method of claim 7, further comprising:
estimating a clustering threshold based on the first information on the network conditions; and
identifying the set of buffered packets based on a comparison of an inter-packet offset between adjacent delivered packets with the clustering threshold, such that, starting from a beginning timestamp of the current TWT session, each subsequent packet is added to the set of buffered packets until a packet is found for which the inter-packet offset with a previous adjacent packet is greater than the clustering threshold.

9. The method of claim 7, further comprising:
determining the features of the set of buffered packets, including a number of the buffered packets and a time duration from a beginning timestamp of the current TWT session to an ending timestamp of a last buffered packet in the set of buffered packets; and
determining a total number of the delivered packets,
wherein estimating the data time further comprises estimating the data time for the current TWT session based on the total number of the delivered packets, the number of the buffered packets, and the time duration from the beginning timestamp of the current TWT session to the ending timestamp of the last buffered packet in the set of buffered packets.

10. The method of claim 9, further comprising:
determining a maximum data time from among data times of a number of previous TWT sessions, and an average data time of the data times of the number of previous TWT sessions;
determining a stable update guard time based on a level of contention that is included in the first information on the network conditions;
determining a new TWT SP duration based on the stable update guard time and one or more of the maximum data time and the average data time of the number of previous TWT sessions; and
periodically updating, with the other communication device, the TWT SP duration for the future TWT session to be the new TWT SP duration.

11. The method of claim 9, further comprising:
determine a maximum data time from among data times of a number of previous TWT sessions;
periodically evaluating a traffic overflow condition based on a comparison of the data time for the current TWT session with one of the maximum data time of the number of previous TWT sessions or a current TWT SP duration;
determining, based on the traffic overflow condition being met, an overflow guard time based on a level of contention that is included in the first information on the network conditions;
determining, based on the traffic overflow condition being met, a new TWT SP duration based on the overflow guard time and a multiple of the maximum data time of the number of previous TWT sessions; and
updating, based on the traffic overflow condition being met, with the other communication device, the TWT SP duration for the future TWT session to be the new TWT SP duration.

12. The method of claim 11, wherein:
the method further comprises evaluating the traffic overflow condition after every TWT session, and
the traffic overflow condition is met when:
the data time for the current TWT session is greater than the maximum data time of the number of previous TWT sessions by a first predetermined threshold amount, or
the data time for the current TWT session is within a second predetermined threshold amount of the current TWT SP duration, wherein the second predetermined threshold amount is based on the first information on the network conditions.

13. A non-transitory computer-readable medium configured to store instructions that, when executed by a processor, cause the processor to:
obtain first information on network conditions and second information on packets delivered to another communication device during a current target wake time (TWT) session;
identify, based on the second information on the delivered packets, a set of buffered packets from among the delivered packets;
estimate, based on features of the set of buffered packets, a data time of the current TWT session as a total amount of time needed to transmit all of the delivered packets; and
update a TWT service period (SP) duration for a future TWT session based on the first information and the data time.

14. The non-transitory computer-readable medium of claim 13, wherein the instructions, when executed by a processor, further cause the processor to:
estimate a clustering threshold based on the first information on the network conditions; and
identify the set of buffered packets based on a comparison of an inter-packet offset between adjacent delivered packets with the clustering threshold, such that, starting from a beginning timestamp of the current TWT session, each subsequent packet is added to the set of buffered packets until a packet is found for which the inter-packet offset with a previous adjacent packet is greater than the clustering threshold.

15. The non-transitory computer-readable medium of claim 13, wherein the instructions, when executed by a processor, further cause the processor to:
determine the features of the set of buffered packets, including a number of the buffered packets and a time duration from a beginning timestamp of the current TWT session to an ending timestamp of a last buffered packet in the set of buffered packets; and
determine a total number of the delivered packets,
wherein the estimated data time for the current TWT session is based on the total number of the delivered packets, the number of the buffered packets, and the time duration from the beginning timestamp of the current TWT session to the ending timestamp of the last buffered packet in the set of buffered packets.

16. The non-transitory computer-readable medium of claim 15, wherein the instructions, when executed by a processor, further cause the processor to:
determine a maximum data time from among data times of a number of previous TWT sessions, and an average data time of the data times of the number of previous TWT sessions;
determine a stable update guard time based on a level of contention that is included in the first information on the network conditions;
determine a new TWT SP duration based on the stable update guard time and one or more of the maximum data time and the average data time of the number of previous TWT sessions; and
periodically update, with the other communication device, the TWT SP duration for the future TWT session to be the new TWT SP duration.

17. The non-transitory computer-readable medium of claim 15, wherein the instructions, when executed by a processor, further cause the processor to:
periodically evaluate a traffic overflow condition based on a comparison of the data time for the current TWT session with one of a current TWT SP duration or a maximum data time determined from among data times of a number of previous TWT sessions;
determine, based on the traffic overflow condition being met, an overflow guard time based on a level of contention that is included in the first information on the network conditions;
determine, based on the traffic overflow condition being met, a new TWT SP duration based on the overflow guard time and a multiple of the maximum data time of the number of previous TWT sessions; and
update, based on the traffic overflow condition being met, with the other communication device, the TWT SP duration for the future TWT session to be the new TWT SP duration.

* * * * *